(12) United States Patent
Blaner et al.

(10) Patent No.: US 9,229,868 B2
(45) Date of Patent: *Jan. 5, 2016

(54) DATA RECOVERY FOR COHERENT ATTACHED PROCESSOR PROXY

(71) Applicant: INTERNATIONAL BUSINESS MACHINES CORPORATION, Armonk, NY (US)

(72) Inventors: Bartholomew Blaner, Underhill Center, VT (US); Kenneth A. Lauricella, Colchester, VT (US); Joseph G. McDonald, Raleigh, NC (US); Michael S. Siegel, Raleigh, NC (US); Jeff A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 113 days.

This patent is subject to a terminal disclaimer.

(21) Appl. No.: 14/035,470

(22) Filed: Sep. 24, 2013

(65) Prior Publication Data

US 2014/0201466 A1 Jul. 17, 2014

Related U.S. Application Data

(63) Continuation of application No. 13/739,525, filed on Jan. 11, 2013, now Pat. No. 8,938,587.

(51) Int. Cl.
*G06F 12/08* (2006.01)
(52) U.S. Cl.
CPC .......... *G06F 12/0815* (2013.01); *G06F 12/082* (2013.01); *G06F 12/0831* (2013.01)

(58) Field of Classification Search
CPC G06F 12/0815; G06F 12/082; G06F 12/0831
See application file for complete search history.

(56) References Cited

U.S. PATENT DOCUMENTS

| 5,668,943 | A | 9/1997 | Attanasio et al. |
| 5,987,571 | A | 11/1999 | Shibata et al. |

(Continued)

FOREIGN PATENT DOCUMENTS

CN 1601489 A 3/2005

OTHER PUBLICATIONS

Mentre et al., "Towards designing SVM coherence protocols using high-level specifications and aspect-oriented translations", Institut National de Recherche en Informatique et en Automatique, pp. 1-16, Sep. 1999.

(Continued)

*Primary Examiner* — Yong Choe
(74) *Attorney, Agent, or Firm* — Russell Ng PLLC; Matthew Baca

(57) ABSTRACT

A coherent attached processor proxy (CAPP) that participates in coherence communication in a primary coherent system on behalf of an attached processor external to the primary coherent system tracks delivery of data to destinations in the primary coherent system via one or more entries in a data structure. Each of the one or more entries specifies with a destination tag a destination in the primary coherent system to which data is to be delivered from the attached processor. In response to initiation of recovery operations for the CAPP, the CAPP performs data recovery operations, including transmitting, to at least one destination indicated by the destination tag of one or more entries, an indication of a data error in data to be delivered to that destination from the attached processor.

7 Claims, 16 Drawing Sheets

(56) References Cited

U.S. PATENT DOCUMENTS

| | | | |
|---|---|---|---|
| 6,014,721 | A | 1/2000 | Arimilli et al. |
| 6,298,418 | B1 | 10/2001 | Fujiwara et al. |
| 6,622,217 | B2 | 9/2003 | Gharachorloo et al. |
| 6,636,949 | B2 | 10/2003 | Barroso et al. |
| 6,704,816 | B1 | 3/2004 | Burke |
| 6,848,003 | B1 | 1/2005 | Arimilli et al. |
| 7,003,630 | B1 | 2/2006 | Kissell |
| 7,017,025 | B1 | 3/2006 | Kissell |
| 7,266,587 | B2 | 9/2007 | Rowlands |
| 7,366,851 | B2 | 4/2008 | Bell et al. |
| 7,389,388 | B2 | 6/2008 | Cantin et al. |
| 7,447,845 | B2 | 11/2008 | Clark et al. |
| 7,543,120 | B2 | 6/2009 | Bell et al. |
| 7,734,876 | B2 | 6/2010 | Fields et al. |
| 8,005,955 | B2 | 8/2011 | Andreev et al. |
| 8,139,592 | B2 | 3/2012 | Clark et al. |
| 8,234,451 | B1 | 7/2012 | Agarwal et al. |
| 8,521,624 | B2 | 8/2013 | Ahmed |
| 8,799,574 | B2 | 8/2014 | Corda |
| 2002/0038407 | A1 | 3/2002 | Mounes-Toussi et al. |
| 2004/0123040 | A1 | 6/2004 | Jung et al. |
| 2005/0071564 | A1 | 3/2005 | Luick |
| 2006/0179252 | A1 | 8/2006 | Cantin et al. |
| 2006/0294312 | A1 | 12/2006 | Walmsley |
| 2007/0005909 | A1 | 1/2007 | Cai et al. |
| 2007/0073998 | A1 | 3/2007 | Chung et al. |
| 2008/0005487 | A1 | 1/2008 | Hum et al. |
| 2008/0016279 | A1 | 1/2008 | Clark et al. |
| 2008/0222648 | A1 | 9/2008 | Clark et al. |
| 2009/0319726 | A1 | 12/2009 | Cantin et al. |
| 2010/0293353 | A1 | 11/2010 | Sonnier et al. |
| 2010/0312970 | A1 | 12/2010 | Bell et al. |
| 2012/0005391 | A1 | 1/2012 | Byrne et al. |
| 2012/0304266 | A1 | 11/2012 | Subramaniam et al. |
| 2013/0042038 | A1 | 2/2013 | Byrne et al. |
| 2013/0290541 | A1 | 10/2013 | Hatasaki et al. |

OTHER PUBLICATIONS

Chaudhuri et al., "SMTp: An Architecture for Next-generation Scalable Multi-threading", pp. 124-135, Jun. 19-23, 2004.

Kintex, "PCIe-287N, Quad SFP+, Kintex-7 and Memory Card", Nallatech a subsidiary of Interconnect Systems Inc, pp. 1-2, NT190-0461/Version 1.3/Jan. 2012. URL obtained Dec. 3, 2012: http://www.nallatech.com/images/stories/product_briefs/pcie-287n-product-brief-1-4.pdf.

Tumeo et al., "A Design Kit for a Fully Working Shared Memory Multiprocessor on FPGA", Copyright 2007 ACM, pp. 219-222, Mar. 11-13, 2007.

Ang, Boon Seong; "Design and Implementation of a Multi-Purpose Cluster System Network Interface Unit"; Dept of Electrical Engineering, Mass. Institute of Tech., Feb. 1999. (221 pg).

Yang et al., "Speeding up the Memory Hierarchy in Flat COMA Multiprocessors", This paper appears in: High-Performance Computer Architecture, pp. 4-13, Feb. 1-5, 1997.

Andrews et al., "Programming Models for Hybrid FPGA-CPU Computational Components: A Missing Link", Published by the IEEE Computer Society, pp. 42-53, Jul.-Aug. 2004.

ISA/CN, Int'l Appln No. PCT/IB2013/058917; Int'l Search Report and Written Opinion dated Apr. 3, 2014 (10 pages).

U.S. Appl. No. 13/686,454 entitled "Coherent Attached Processor Proxy Supporting Master Parking"; Non-final office action dated Aug. 14, 2014 (45 pg).

U.S. Appl. No. 13/776,968 entitled "Coherent Attached Processor Proxy Supporting Master Parking"; Non-final office action dated Aug. 6, 2014 (23 pg).

U.S. Appl. No. 13/686,537 entitled "Programmable Coherent Proxy for Attached Processor"; Notice of Allowance dated Aug. 13, 2014.

U.S. Appl. No. 13/739,525 entitled "Data Recovery for Coherent Attached Processor Proxy"; Notice of Allowance dated Sep. 2, 2014 (7 pg).

U.S. Appl. No. 13/739,525 entitled "Data Recovery for Coherent Attached Processor Proxy"; Ex Parte Quayle Action dated Jul. 31, 2014 (5 pg).

U.S. Appl. No. 13/777,847 entitled "Coherent Proxy for Attached Processor"; Non-final office action dated Oct. 8, 2014 (13 pg).

U.S. Appl. No. 13/686,489 entitled "Coherent Proxy for Attached Processor"; Non-final office action dated Oct. 8, 2014 (22 pg).

U.S. Appl. No. 13/739,714 entitled "Epoch-Based Recovery for Coherent Attached Processor Proxy"; Ex Parte Quayle action dated Sep. 9, 2014 (10 pg).

U.S. Appl. No. 13/739,770 entitled "Accelerated Recovery for Snooped Addresses in a Coherent Attached Processor Proxy"; Ex Parte Quayle action dated Sep. 15, 2014 (5 pg).

U.S. Appl. No. 13/777,028 entitled "Programmable Coherent Proxy for Attached Processor"; Non-final office action dated Sep. 29, 2014 (20 pg).

Kalla et al., "POWER7: IBM's Next-Generation Server Processor", Published by the IEEE Computer Society, pp. 7-15, Mar./Apr. 2010.

Le et al., "IBM POWER6 microarchitecture", IBM J. Res. & Dev. vol. 51 No. 6,, pp. 639-662, Nov. 2007.

Suh et al., "Cache Coherence Support for Non•Shared Bus Architecture on Heterogeneous MPSoCs", This paper appears in: Design Automation Conference, Conference Publication, pp. 553-558, Jun. 13-17, 2005.

Tendler et al., "POWER4 System Microarchitecture", Technical White Paper, pp. 1-33, Oct. 2001.

U.S. Appl. No. 13/686,454 entitled "Coherent Attached Processor Proxy Supporting Master Parking"; Fnal Office Action dated Feb. 13, 2015 (41 pg).

U.S. Appl. No. 13/776,968 entitled "Coherent Attached Processor Proxy Supporting Master Parking"; Final office action dated Feb. 13, 2015 (31 pg).

U.S. Appl. No. 13/686,489 entitled "Coherent Proxy for Attached Processor"; Notice of Allowance dated Feb. 27, 2015 (15 pg).

U.S. Appl. No. 13/777,847 entitled "Coherent Proxy for Attached Processor"; Notice of Allowance dated Mar. 17, 2015 (12 pg).

U.S. Appl. No. 13/739,714 entitled "Epoch-Based Recovery for Coherent Attached Processor Proxy"; Notice of Allowance dated Dec. 22, 2014 (16 pg).

U.S. Appl. No. 14/036,072 entitled "Epoch-Based Recovery for Coherent Attached Processor Proxy"; Non-final office action dated Mar. 16, 2015 (16 pg).

U.S. Appl. No. 14/036,109 entitled "Accelerated Recovery for Snooped Addresses in a Coherent Attached Processor Proxy"; Non-final office action dated Mar. 13, 2015 (18 pg).

U.S. Appl. No. 14/036,195 entitled "Selection of Post-Request Action Based on Combined Response and Input From the Request Source"; Non-final office action dated Mar. 16, 2015 (26 pg).

DATA RECOVERY FOR COHERENT ATTACHED PROCESSOR PROXY

PRIORITY CLAIM

This application is a continuation of U.S. patent application Ser. No. 13/739,525, entitled "DATA RECOVERY FOR COHERENT ATTACHED PROCESSOR PROXY," filed on Jan. 11, 2013, the disclosure of which is incorporated herein by reference in its entirety for all purposes.

BACKGROUND OF THE INVENTION

The present invention relates to data processing, and more specifically, to a coherent proxy for an attached processor.

A conventional distributed shared memory computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Because multiple processor cores may request write access to a same memory block (e.g., cache line or sector) and because cached memory blocks that are modified are not immediately synchronized with system memory, the cache hierarchies of multiprocessor computer systems typically implement a cache coherency protocol to ensure at least a minimum required level of coherence among the various processor core's "views" of the contents of system memory. The minimum required level of coherence is determined by the selected memory consistency model, which defines rules for the apparent ordering and visibility of updates to the distributed shared memory. In all memory consistency models in the continuum between weak consistency models and strong consistency models, cache coherency requires, at a minimum, that after a processing unit accesses a copy of a memory block and subsequently accesses an updated copy of the memory block, the processing unit cannot again access the old ("stale") copy of the memory block.

A cache coherency protocol typically defines a set of cache states stored in association with cached copies of memory blocks, as well as the events triggering transitions between the cache states and the cache states to which transitions are made. Coherency protocols can generally be classified as directory-based or snoop-based protocols. In directory-based protocols, a common central directory maintains coherence by controlling accesses to memory blocks by the caches and by updating or invalidating copies of the memory blocks held in the various caches. Snoop-based protocols, on the other hand, implement a distributed design paradigm in which each cache maintains a private directory of its contents, monitors ("snoops") the system interconnect for memory access requests targeting memory blocks held in the cache, and responds to the memory access requests by updating its private directory, and if required, by transmitting coherency message(s) and/or its copy of the memory block.

The cache states of the coherency protocol can include, for example, those of the well-known MESI (Modified, Exclusive, Shared, Invalid) protocol or a variant thereof. The MESI protocol allows a cache line of data to be tagged with one of four states: "M" (Modified), "E" (Exclusive), "S" (Shared), or "I" (Invalid). The Modified state indicates that a memory block is valid only in the cache holding the Modified memory block and that the memory block is not consistent with system memory. The Exclusive state indicates that the associated memory block is consistent with system memory and that the associated cache is the only cache in the data processing system that holds the associated memory block. The Shared state indicates that the associated memory block is resident in the associated cache and possibly one or more other caches and that all of the copies of the memory block are consistent with system memory. Finally, the Invalid state indicates that the data and address tag associated with a coherency granule are both invalid.

BRIEF SUMMARY

In at least one embodiment, a coherent attached processor proxy (CAPP) that participates in coherence communication in a primary coherent system on behalf of an attached processor external to the primary coherent system tracks delivery of data to destinations in the primary coherent system via one or more entries in a data structure. Each of the one or more entries specifies with a destination tag a destination in the primary coherent system to which data is to be delivered from the attached processor. In response to initiation of recovery operations for the CAPP, the CAPP performs data recovery operations, including transmitting, to at least one destination indicated by the destination tag of one or more entries, an indication of a data error in data to be delivered to that destination from the attached processor.

In at least one embodiment, a coherent attached processor proxy (CAPP) participates in coherence communication in a primary coherent system on behalf of an attached processor external to the primary coherent system. The CAPP includes an epoch timer that advances at regular intervals to define epochs of operation of the CAPP. Each of one or more entries in a data structure in the CAPP are associated with a respective epoch. Recovery operations for the CAPP are initiated based on a comparison of an epoch indicated by the epoch timer and the epoch associated with one of the one or more entries in the data structure.

In at least one embodiment, a coherent attached processor proxy (CAPP) that participates in coherence communication in a primary coherent system on behalf of an external attached processor maintains, in each of a plurality of entries of a CAPP directory, information regarding a respective associated cache line of data from the primary coherent system cached by the attached processor. In response to initiation of recovery operations, the CAPP transmits, in a generally sequential order with respect to the CAPP directory, multiple memory access requests indicating an error for addresses indicated by the plurality of entries. In response to a snooped memory access request that targets a particular address hitting in the CAPP directory during the transmitting, the CAPP performs a coherence recovery operation for the particular address prior to a time indicated by the generally sequential order.

DETAILED DESCRIPTION

Figure 1:
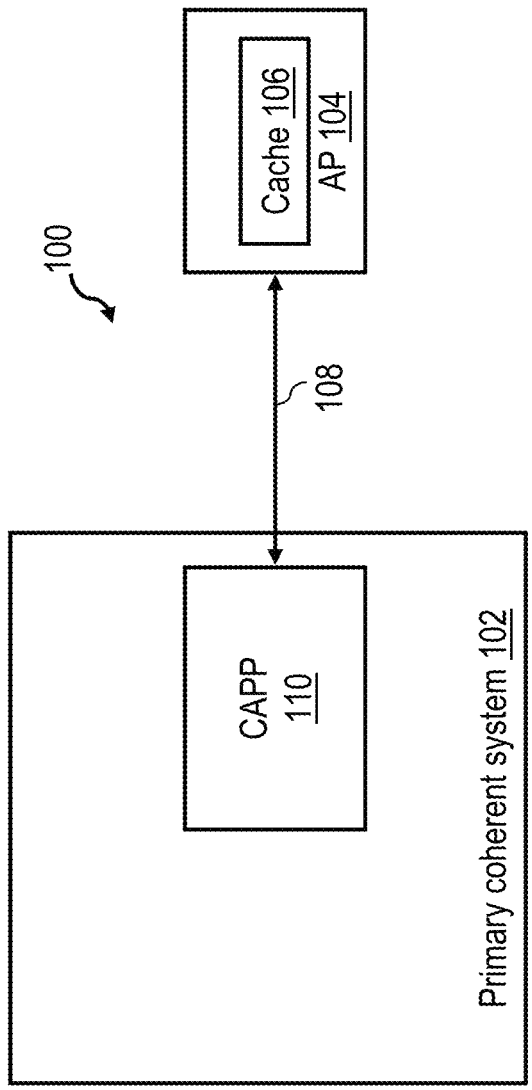
FIG. 1 is a high level block diagram of an exemplary data processing system in which a coherent device participates with a primary coherent system across a communication link through a proxy.

With reference now to the figures and with particular reference to FIG. 1, there is illustrated a high level block diagram of an exemplary data processing system 100 in which a coherent device participates with a primary coherent system across a communication link through a proxy. As shown, data processing system 100 includes a primary coherent system 102 in which coherency of a distributed shared memory is maintained by implementation of a coherency protocol, such as the well-known MESI protocol or a variant thereof. The coherency protocol, which in various embodiments can be directory-based or snoop-based, is characterized by a bounded time frame in which a system-wide coherency response is determined for each memory access request.

As shown, the functionality of data processing system 100 can be expanded by coupling an attached processor (AP) 104 to primary coherent system 102 by a communication link 108. AP 104 may be implemented, for example, as a field programmable gate array (FPGA), application specific integrated circuit (ASIC), or other general or special-purpose processor or system. In various embodiments, AP 104 may, for example, serve as a co-processor that off-loads predetermined processing tasks from primary coherent system 102, provide low cost expansion of the general-purpose processing capabilities of data processing system 100, and/or provide an interface with a heterogeneous system external to primary coherent system 102. In support of these and other possible functions of AP 104, AP 104 preferably includes a cache 106 that holds local copies of memory blocks in the coherent memory address space of primary coherent system 102 to enable low latency access to those memory blocks by AP 104.

In many cases, the technology utilized to implement AP 104, cache 106, and/or communication link 108 has insufficient speed, bandwidth and/or reliability to guarantee that AP 104 can participate in the determination of the system-wide coherency responses for memory access requests within the bounded time frame required by the coherency protocol of primary coherent system 102. Accordingly, primary coherent system 102 further includes a coherent attached processor proxy (CAPP) 110 that participates on behalf of AP 104 in the determination of the system-wide coherency responses for AP 104 within a timeframe that satisfies the timing requirements of the coherency protocol of primary coherent system 102. Although not required, it is preferable if CAPP 110 is programmable and can therefore be programmed to support any of multiple different implementations of AP 104.

Figure 2:
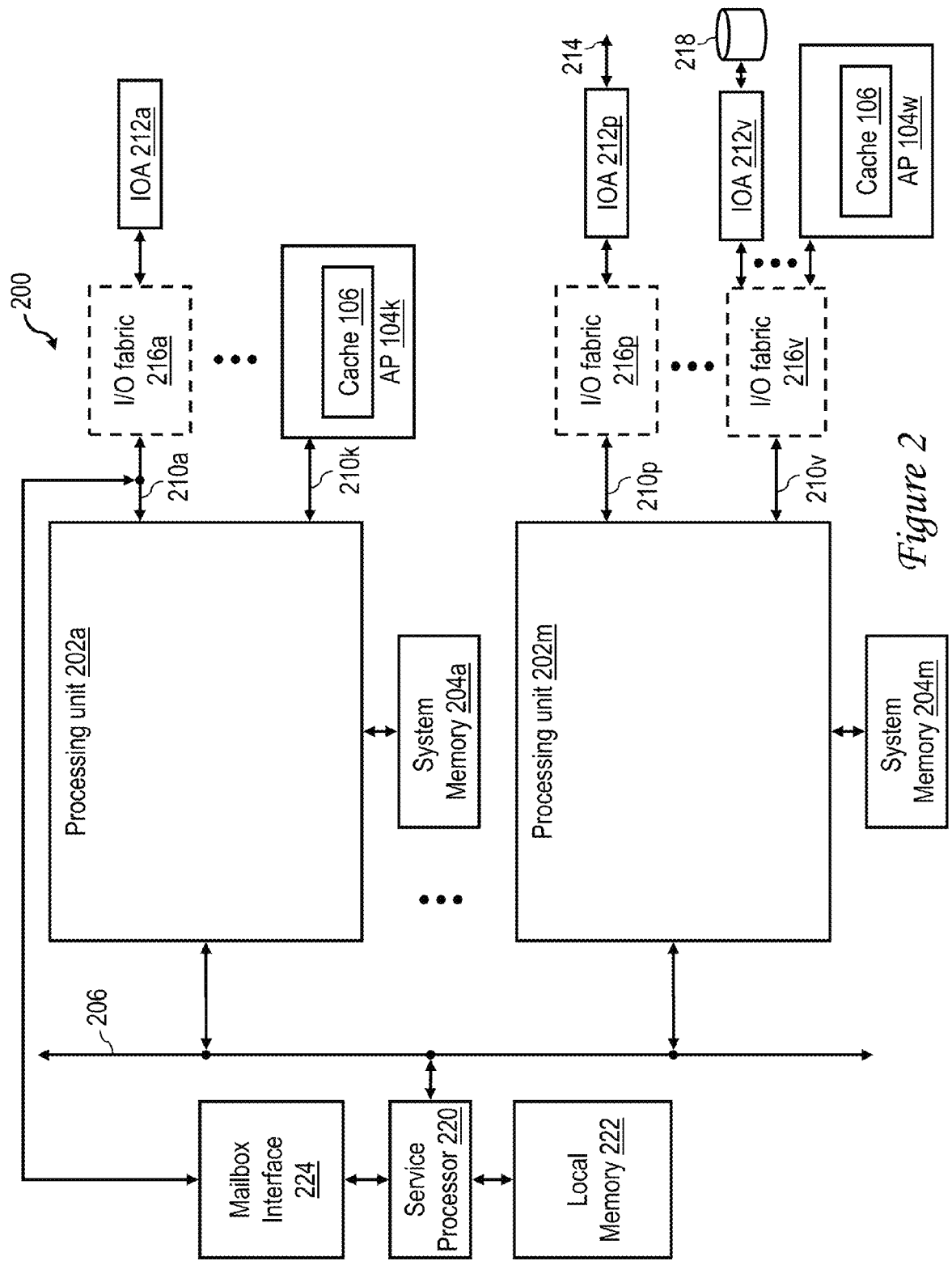
FIG. 2 is a more detailed block diagram of an exemplary embodiment of the data processing system of FIG. 1.

Referring now to FIG. 2, there is depicted a more detailed block diagram of a data processing system 200 that is one of the numerous possible embodiments of data processing system 100 of FIG. 1. Data processing system 200 may be implemented, for example, with one of the IBM Power servers, a product line of International Business Machines Corporation of Armonk, N.Y.

In the depicted embodiment, data processing system 200 is a distributed shared memory multiprocessor (MP) data processing system including a plurality of processing units 202a-202m. Each of processing units 202a-202m is supported by a respective one of shared system memories 204a-204m, the contents of which may generally be accessed by any of processing units 202a-202m. Processing units 202a-202m are further coupled for communication to a system fabric 206, which may include one or more bused, switched and/or wireless communication links. The communication on system fabric 206 includes memory access requests by processing units 202 requesting coherent access to various memory blocks within various shared system memories 204a-204m.

As further shown in FIG. 2, one or more of processing units 204a-204m are further coupled to one or more communication links 210 providing expanded connectivity. For example, processing units 202a and 202m are respectively coupled to communication links 210a-210k and 210p-210v, which may be implemented, for example, with Peripheral Component Interconnect express (PCIe) local buses. As shown, communication links 210 can be utilized to support the direct or indirect coupling of input/output adapters (IOAs) such as IOAs 212a, 212p and 212v, which can be, for example, network adapters, storage device controllers, display adapters, peripheral adapters, etc. For example, IOA 212p, which is network adapter coupled to an external data network 214, is coupled to communication link 210p optionally through an I/O fabric 216p, which may comprise one or more switches and/or bridges. In a similar manner, IOA 212v, which is a storage device controller that controls storage device 218, is coupled to communication link 210v optionally through an I/O fabric 216v. As discussed with reference to FIG. 1, communication links 210 can also be utilized to support the attachment of one or more APs 104, either directly to a processing unit 202, as is the case for AP 104k, which is coupled to processing unit 202a by communication link 210k, or indirectly to a processing unit 202 through an intermediate I/O fabric 216, as can be the case for AP 104w, which can be coupled to processing unit 202m through communication link 210v and optional I/O fabric 216v.

Data processing system 200 further includes a service processor 220 that manages the boot process of data processing system 200 and thereafter monitors and reports on the performance of and error conditions detected in data processing system 200. Service processor 220 is coupled to system fabric 206 and is supported by a local memory 222, which may include volatile (e.g., dynamic random access memory (DRAM)) and non-volatile memory (e.g., non-volatile random access memory (NVRAM) or static random access memory (SRAM)). Service processor 220 is further coupled to a mailbox interface 224 through which service processor 220 communicates I/O operations with communication link 210a.

Those of ordinary skill in the art will appreciate that the architecture and components of a data processing system can vary between embodiments. For example, other devices and interconnects may alternatively or additionally be used. Accordingly, the exemplary data processing system 200 given in FIG. 2 is not meant to imply architectural limitations with respect to the claimed invention. Further, it should be appreciated that the hardware resources of data processing system 200 may be logically partitioned into multiple, non-intersecting sets of resources, each controlled by a respective one of multiple possibly heterogeneous operating system instances. In a system logically partitioned in this manner, the operating systems concurrently execute on the common hardware platform in their respective logical partitions (LPARs) under the control of system firmware, which is referred to as a virtual machine monitor (VMM) or hypervisor.

Figure 3:
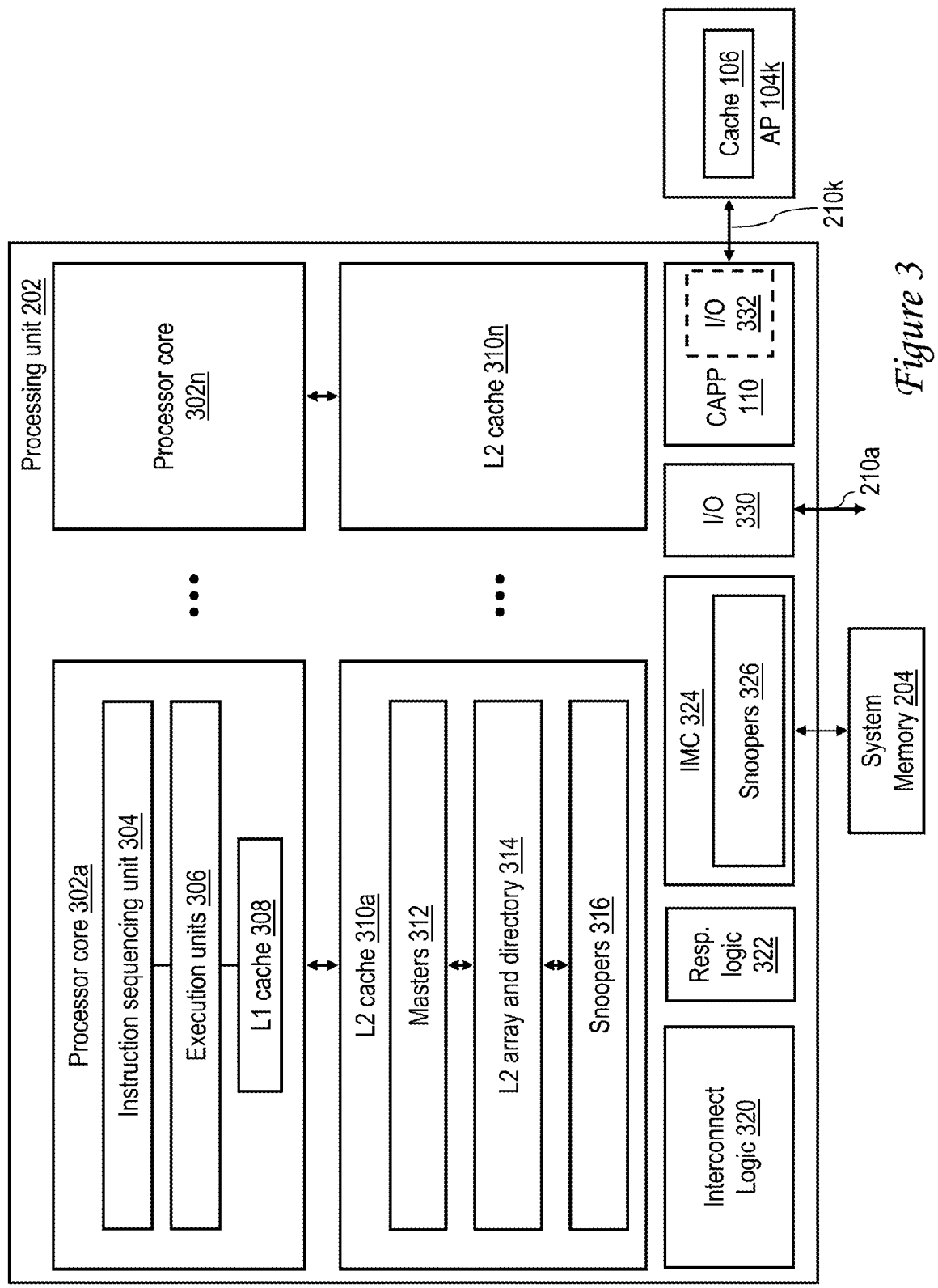
FIG. 3 is a more detailed block diagram of an exemplary embodiment of a processing unit in the data processing system of FIG. 2.

With reference now to FIG. 3, there is illustrated a more detailed block diagram of an exemplary embodiment of a processing unit 202 in data processing system 200 of FIG. 2. In the depicted embodiment, each processing unit 202 is preferably realized as a single integrated circuit chip having a substrate in which semiconductor circuitry is fabricated as is known in the art.

Each processing unit 202 includes multiple processor cores 302a-302n for independently processing instructions and data. Each processor core 302 includes at least an instruction sequencing unit (ISU) 304 for fetching and ordering instructions for execution and one or more execution units 306 for executing instructions. The instructions executed by execution units 306 may include, for example, fixed and floating point arithmetic instructions, logical instructions, and instructions that request read and write access to a memory block in the coherent address space of data processing system 200.

The operation of each processor core 302a-302n is supported by a multi-level volatile memory hierarchy having at its lowest level one or more shared system memories 204 (only one of which is shown in FIG. 3) and, at its upper levels, one or more levels of cache memory. As depicted, processing unit 202 includes an integrated memory controller (IMC) 324 that controls read and write access to an associated system memory 204 in response to requests received from processor cores 302a-302n and operations received on system fabric 206.

In the illustrative embodiment, the cache memory hierarchy of processing unit 202 includes a store-through level one (L1) cache 308 within each processor core 302a-302n and a store-in level two (L2) cache 310. As shown, L2 cache 310 includes an L2 array and directory 314, masters 312 and snoopers 316. Masters 312 initiate transactions on system fabric 206 and access L2 array and directory 314 in response to memory access (and other) requests received from the associated processor cores 302. Snoopers 316 detect operations on system fabric 206, provide appropriate responses, and perform any accesses to L2 array and directory 314 required by the operations. Although the illustrated cache hierarchy includes only two levels of cache, those skilled in the art will appreciate that alternative embodiments may include additional levels (L3, L4, etc.) of private or shared, on-chip or off-chip, in-line or lookaside cache, which may be fully inclusive, partially inclusive, or non-inclusive of the contents the upper levels of cache.

As further shown in FIG. 3, processing unit 202 includes integrated interconnect logic 320 by which processing unit 202 is coupled to system fabric 206, as well as an instance of response logic 322, which in embodiments employing snoop-based coherency, implements a portion of a distributed coherency messaging mechanism that maintains coherency of the cache hierarchies of processing unit 202. Processing unit 202 further includes one or more integrated I/O (input/output) controllers 330 (e.g., PCI host bridges (PHBs)) supporting I/O communication via one or more communication links 210. Processing unit 202 additionally includes a CAPP 110 as previously described. As shown, CAPP 110 may optionally include a dedicated I/O controller 332 (e.g., a PHB) by which CAPP 110 supports communication over an external communication link 210k to which an AP 104k is also coupled. In alternative embodiments, dedicated I/O controller 332 can be omitted, and CAPP 110 can communicate with AP 104 via a shared I/O controller 330.

Those skilled in the art will appreciate that data processing system 200 can include many additional or alternative components. Because such additional components are not necessary for an understanding of the present invention, they are not illustrated in FIG. 3 or discussed further herein.

Figure 4:
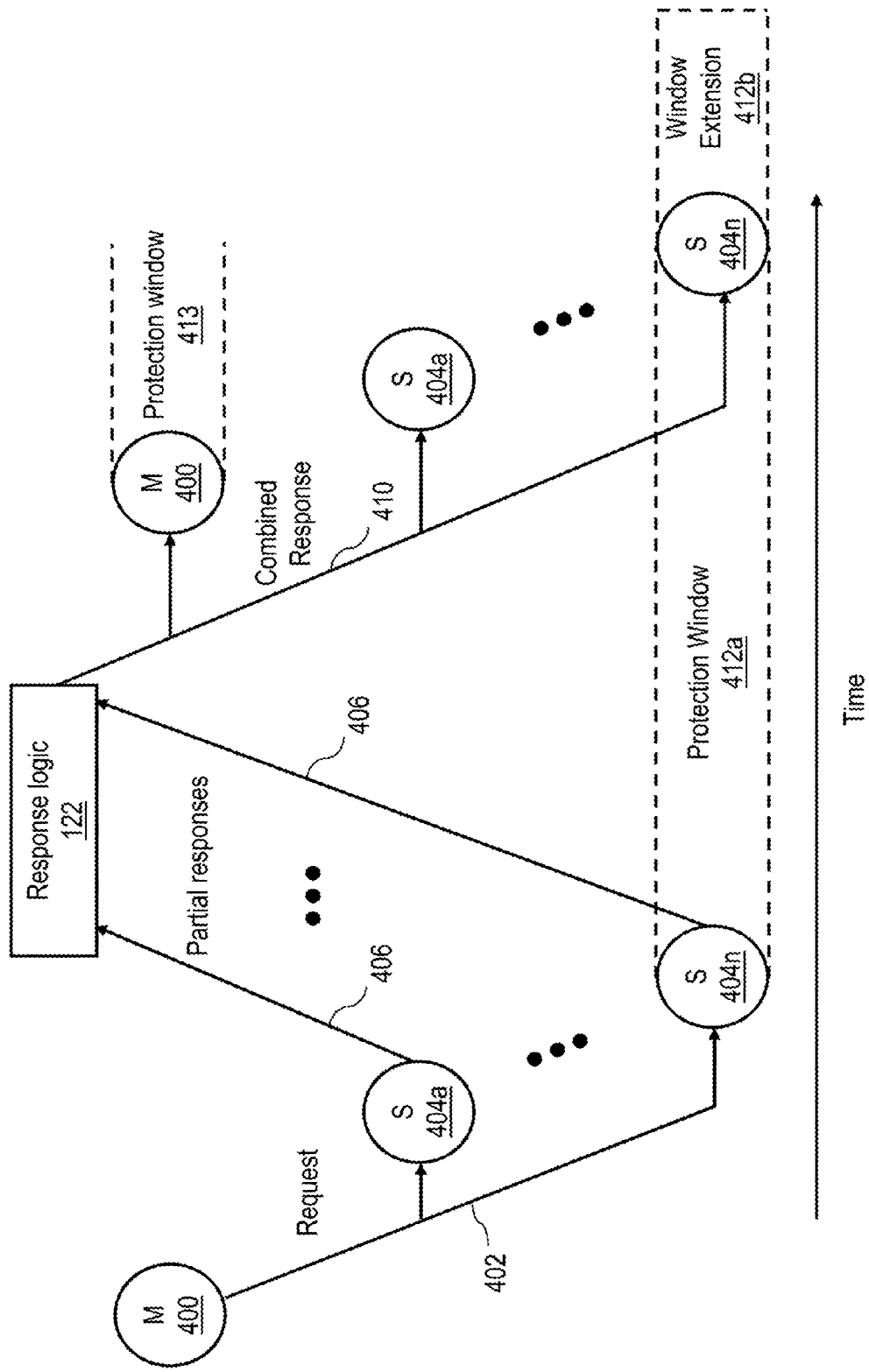
FIG. 4 is a time-space diagram of an exemplary operation on the system fabric of the data processing system of FIG. 2.

Referring now to FIG. 4, there is depicted a time-space diagram of an exemplary operation on the system fabric 206 of data processing system 200 of FIG. 2 in accordance with one embodiment of a snoop-based coherence protocol. The operation begins when a master 400 (e.g., a master 312 of an L2 cache 310, a master within an I/O controller 330 or a master in CAPP 110) issues a request 402 on system fabric 206. Request 402 preferably includes at least a transaction type indicating a type of desired access and a resource identifier (e.g., real address) indicating a resource to be accessed by the request. Common types of requests preferably include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| BKILL (Background Kill) | Requests invalidation of all cached copies of a target memory block and cancellation of all reservations for the target memory block |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |

Further details regarding these operations and an exemplary cache coherency protocol that facilitates efficient handling of these operations may be found in U.S. Pat. No. 7,389,388, which is incorporated by reference.

Figure 5:
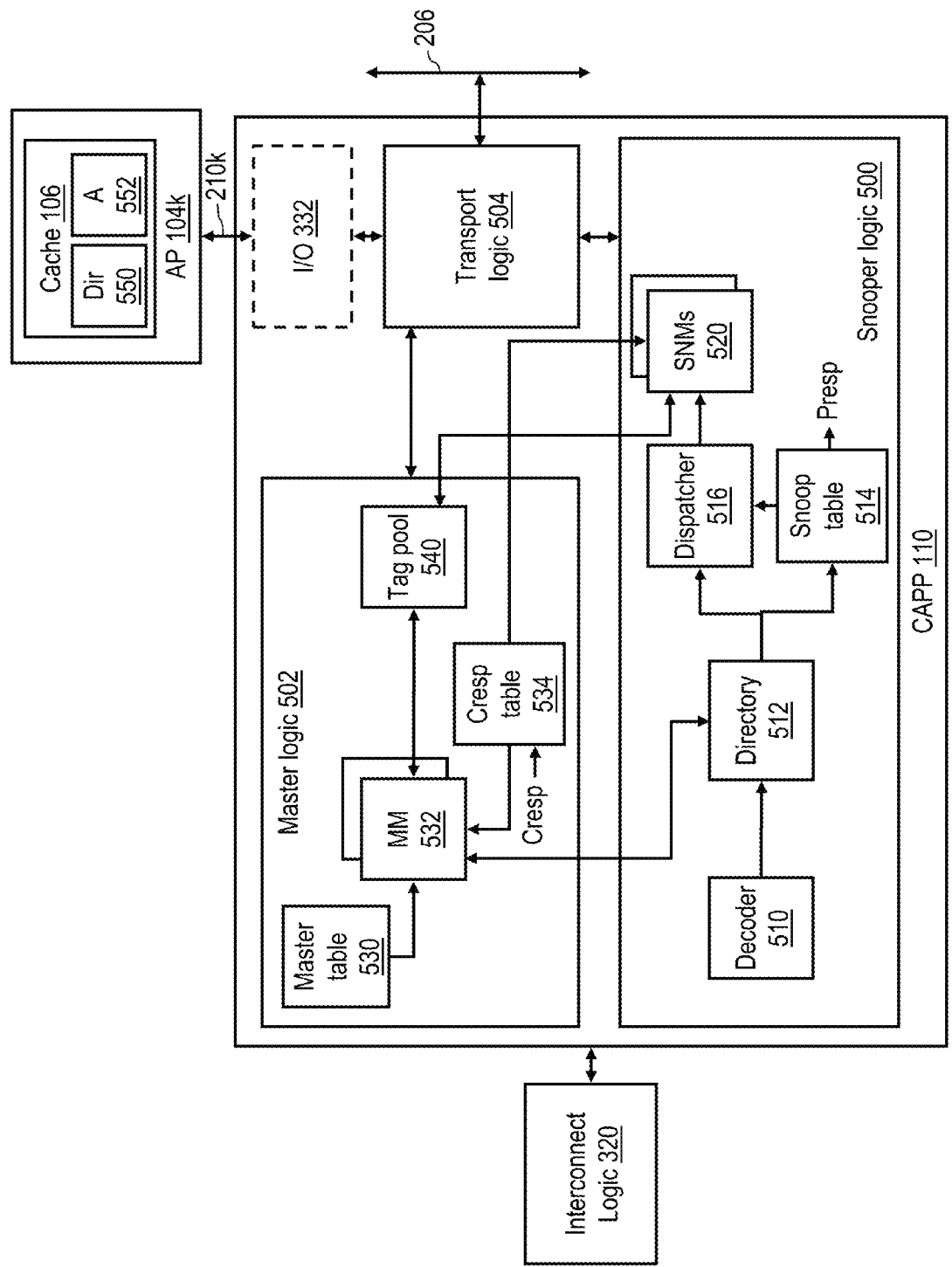
FIG. 5 is a more detailed block diagram of an exemplary embodiment of the coherent attached processor proxy (CAPP) in the processing unit of FIG. 3.

Request 402 is received by snoopers 404 distributed throughout data processing system 200, including, for example, snoopers 316 of L2 caches 310, snoopers 326 of IMCs 324, and snoopers within CAPPs 110 (see, e.g., snoop machines (SNMs) 520 of FIG. 5). In general, with some exceptions, snoopers 316 in the same L2 cache 310 as the master 312 of request 402 do not snoop request 402 (i.e., there is generally no self-snooping) because a request 402 is transmitted on system fabric 206 only if the request 402 cannot be serviced internally by a processing unit 202. Snoopers 404 that receive and process requests 402 each provide a respective partial response (Presp) 406 representing the response of at least that snooper 404 to request 402. A snooper 326 within an IMC 324 determines the partial response 406 to provide based, for example, upon whether the snooper 326 is responsible for the request address and whether it has resources available to service the request. A snooper 316 of an L2 cache 310 may determine its partial response 406 based on, for example, the availability of its L2 array and directory 314, the availability of a snoop machine instance within snooper 316 to handle the request, and the coherence state associated with the request address in L2 array and directory 314.

The partial responses 406 of snoopers 404 are logically combined either in stages or all at once by one or more instances of response logic 322 to determine a systemwide coherence response to request 402, referred to herein as a combined response (Cresp) 410. In one preferred embodiment, which will be assumed hereinafter, the instance of response logic 322 responsible for generating combined response 410 is located in the processing unit 202 containing the master 400 that issued request 402. Response logic 322 provides combined response 410 to master 400 and snoopers 404 via system fabric 206 to indicate the response (e.g., success, failure, retry, etc.) to request 402. If combined response 410 indicates success of request 402, combined response 410 may indicate, for example, a data source for a requested memory block, a cache state in which the requested memory block is to be cached by master 400, and whether "cleanup" operations invalidating the requested memory block in one or more caches are required.

In response to receipt of combined response 410, one or more of master 400 and snoopers 404 typically perform one or more actions in order to service request 402. These actions may include supplying data to master 400, invalidating or otherwise updating the coherence state of data cached in one or more caches, performing castout operations, writing back data to a system memory 204, etc. If required by request 402, a requested or target memory block may be transmitted to or from master 400 before or after the generation of combined response 410 by response logic 322.

In the following description, the partial response 406 of a snooper 404 to a request 402 and the actions performed by the snooper 404 in response to the request 402 and/or its combined response 410 will be described with reference to whether that snooper is a Highest Point of Coherency (HPC), a Lowest Point of Coherency (LPC), or neither with respect to the request address specified by the request. An LPC is defined herein as a memory device or I/O device that serves as the repository for a memory block. In the absence of a HPC for the memory block, the LPC holds the true image of the memory block and has authority to grant or deny requests to generate an additional cached copy of the memory block. For a typical request in the data processing system embodiment of FIG. 2, the LPC will be the memory controller 324 for the system memory 204 holding the referenced memory block. An HPC is defined herein as a uniquely identified device that caches a true image of the memory block (which may or may not be consistent with the corresponding memory block at the LPC) and has the authority to grant or deny a request to modify the memory block. Descriptively, the HPC may also provide a copy of the memory block to a requestor in response to an operation that does not modify the memory block. Thus, for a typical request in the data processing system embodiment of FIG. 2, the HPC, if any, will be an L2 cache 310 or CAPP 110. Although other indicators may be utilized to designate an HPC for a memory block, a preferred embodiment of the present invention designates the HPC, if any, for a memory block utilizing selected cache coherency state(s), which may be held, for example, in a cache directory.

Still referring to FIG. 4, the HPC, if any, for a memory block referenced in a request 402, or in the absence of an HPC, the LPC of the memory block, preferably has the responsibility of protecting the transfer of ownership of a memory block, if necessary, in response to a request 402. In the exemplary scenario shown in FIG. 4, a snooper 404n at the HPC (or in the absence of an HPC, the LPC) for the memory block specified by the request address of request 402 protects the transfer of ownership of the requested memory block to master 400 during a protection window 412a that extends from the time that snooper 404n determines its partial response 406 until snooper 404n receives combined response 410 and during a subsequent window extension 412b extending (preferably, for a programmable time) beyond receipt by snooper 404n of combined response 410. During protection window 412a and window extension 412b, snooper 404n protects the transfer of ownership by providing partial responses 406 to other requests specifying the same request address that prevent other masters from obtaining ownership (e.g., a retry partial response) until ownership has been successfully transferred to master 400. If necessary, master 400 may also likewise initiate a protection window 413 to protect its ownership of the memory block requested in request 402 following receipt of combined response 410.

As will be appreciated by those skilled in the art, the snoop-based coherence protocol illustrated in FIG. 4 may be implemented utilizing multiple diverse sets of coherence states. In a preferred embodiment, the cache coherence states employed within the protocol, in addition to providing (1) an indication of whether a cache is the HPC for a memory block, also indicate at least (2) whether the cached copy is unique (i.e., is the only cached copy system-wide), (3) whether and when the cache can provide a copy of the memory block to a master of a memory access request for the memory block, (4) whether the cached image of the memory block is consistent with the corresponding memory block at the LPC (system memory). These attributes can be expressed, for example, in a variant of the well-known MESI (Modified, Exclusive, Shared, Invalid) protocol including at least the coherence states summarized below in Table II.

TABLE II

| Coherence state | HPC? | Unique? | Data Source? | Consistent with LPC? |
| --- | --- | --- | --- | --- |
| M (Modified) | Yes | Yes | Yes (before Cresp) | No |
| T (Shared-Owner) | Yes | Unknown | Yes (after Cresp) | No |
| S (Shared) | No | Unknown | No | Unknown |
| I (Invalid) | No | No | No | N/a—data is invalid |

In addition to the coherence states listed in Table II, the coherence protocol may include one or more additional transitional coherence states that can be employed, among other things, to implement protection window 412a, window extension 412b, and protection window 413. For example, the coherence protocol may include an HPC Protect state that master 400 may assume in response to combined response 410 to protect transfer of HPC status (i.e., coherence ownership) to that master 400 during protection window 413. Similarly, the coherence protocol may additionally include a Shared Protect state that a master 400 or a snooper 404n may assume in response to issuing or snooping a DClaim request, respectively, in order to implement protection window 413 or protection window 412a and window extension 412b. Further, the coherence protocol may include an Shared Protect Noted state that may be assumed to facilitate assumption of HPC status by another master 400, as described further herein.

Referring now to FIG. 5, there is depicted a more detailed block diagram of an exemplary embodiment of the coherent attached processor proxy (CAPP) 110 in processing unit 202 of FIG. 3. As shown, CAPP 110 is coupled to interconnect logic 320 to permit CAPP 110 to transmit and receive address, control and coherency communication via system fabric 206 on behalf of (i.e., as a proxy for) an AP 104 (e.g., AP 104k) to which it is coupled by a communication link (e.g., communication link 210k).

CAPP 110 includes snooper logic 500, master logic 502, transport logic 504, and as discussed above, an optional I/O controller 332. Transport logic 504 has two interfaces, a first by which transport logic 504 manages communication over communication link 210k as necessary to comport with the messaging protocol employed by communication link 210k and/or AP 104, and a second by which transport logic 504 manages data communication with system fabric 206. Thus, transport logic 504 may packetize data, may apply message encapsulation/decapsulation or encryption/decryption, may compute, append and/or verify checksums, etc., as is known in the art.

Snooper logic 500 includes a decoder 510, a directory 512 of the contents of the data array 552 of the cache 106 of the associated AP 104, a snoop table 514, a dispatcher 516, and a set of snoop machines (SNMs) 520. Decoder 510 of snooper logic 500 receives memory access requests from system fabric 206 via interconnect logic 320 and optionally but preferably decodes the snooped memory access requests into a corresponding set of internal snoop requests. The set of internal snoop requests implemented by decoder 510 is preferably programmable (and in some embodiments dynamically reprogrammable) to decouple the design of CAPP 110 from that of AP 104 and to allow flexibility in mapping the memory access requests of the primary coherent system 102 to the request set of the associated AP 104. Following decoding by decoder 510, the target address specified by the memory access request is utilized to access directory 512 in order to look up the coherence state of the target address with respect to AP 104. It should be noted that the coherence state indicated by directory 512 may not match or correspond to that indicated by directory 550 of cache 106 in AP 104. Nevertheless, the use of the coherence state information in directory 512 in CAPP 110 rather than directory 550 enables the bounded time frame in which a system-wide coherency response is to be determined for each memory access request in primary coherent system 102 to be met, regardless of whether communication link 210 and/or AP 104 have lower speed or reliability than other components of data processing system (e.g., CAPP 110).

The coherence state specified by directory 512 and the internal request determined by decoder 510 are then utilized by snoop table 514 to determine an appropriate partial response (Presp) to the snooped memory access request. In response to at least the internal snoop request determined by decoder 510, coherence state output by directory 512 and Presp output by snoop table 514, dispatcher 516 determines whether or not any further action is or may possibly be required in response to the memory access request (e.g., update of directory 512, sourcing the target cache line to the requester, etc.), and if so, dispatches a snoop machine 520 to manage performance of that action.

Master logic 502 optionally but preferably includes a master table 530 that maps memory access and other requests originated by AP 104k and received by CAPP 110 to internal master requests. As with the mapping performed by decoder 510 of snooper logic 500, the mapping performed by master table 530 decouples the design of CAPP 110 and AP 104 and enables CAPP 110 to programmably support a wide variety of diverse APs 104. In at least some embodiments, master table 530 supports dynamic reprogramming. Master logic 502 further includes a set of master machines (MMs) 532 that services internal master requests output by master table 530. In a typical case, a master machine 532 allocated to service an internal master request determines and manages an action to be performed to service the internal request (e.g., initiating a directory update and/or memory access request on system fabric 206) based at least in part on the coherence state indicated for the target address of the master request by directory 512. Data transfers to and from AP 104 via CAPP 110 in response to the operation of snooper logic 500 and master logic 502 are tracked via entries in a tag pool 540 that associates each data transfer with one or more tags of the destination(s) of the data.

As further indicated in FIG. 5, master logic 502 includes a combined response (Cresp) table 534. In response to receipt of a combined response representing the systemwide coherence response to a request, Cresp table 534 translates the combined response received from system fabric 206 into an internal Cresp message and distributes the internal Cresp message to master machines 532 and snoop machines 520. Again, the translation of combined responses to internal Cresp messages by Cresp table 534 decouples the design of AP 104 from that of primary coherent system 102 and enables the interface provided by CAPP 110 to be programmable and thus support a variety of diverse APs 104.

As noted above, several data structures (e.g., decoder 510, snoop table 514, master table 530 and Cresp table 534) within CAPP 110 are preferably programmable, and in some embodiments, dynamically programmable. In one implementation, a control processor (e.g., service processor 220 or any of processing units 202 running supervisory code (e.g., hypervisor)) dynamically updates the data structures by first instructing AP 104 to invalidate its directory 550 and quiesce. The control processor then updates one or more of the data structures within CAPP 110. In response to completion of the updates, the control processor instructs AP 104 to resume normal processing. It should also be noted that the configurations of master table 530 and snoop table 514 affects not only the mapping (translation) of incoming AP requests and snooped requests, respectively, but also the behavior of MMs 532 and SNMs 520. That is, the behavior of MMs 532 in response to AP requests and the messages transmitted on system fabric 206 and to AP 104 are also preferably determined by the configuration of master table 530. Similarly, the behavior of SNMs 520 in response to snooped requests and the messages transmitted on system fabric 206 and to AP 104 are preferably determined by the configuration of snoop table 514. Thus, the behaviors and messages of MMs 532 and SNMs 520 can be selectively changed by appropriate reprogramming of master table 530 and snoop table 514.

Figure 6:
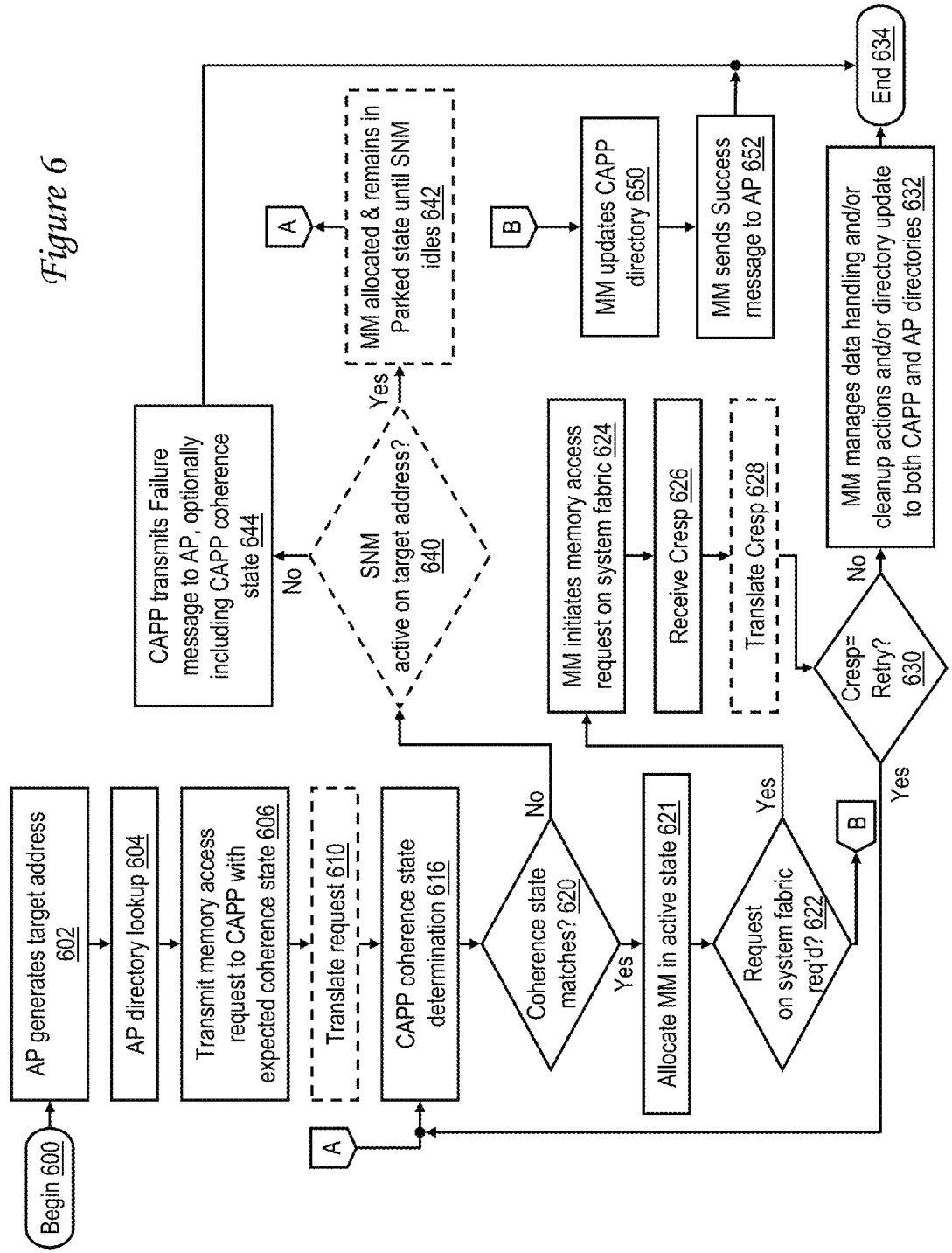
FIG. 6 is a high level logical flowchart of an exemplary process by which a CAPP coherently handles a memory access request received from an attached processor (AP) in accordance with one embodiment.

Referring now to FIG. 6, there is depicted a high level logical flowchart of an exemplary process by which a CAPP 110 coherently handles a memory access request received from an AP 104 in accordance with one embodiment. As with the other logical flowcharts presented herein, it should be appreciated that steps are presented in a logical rather than strictly chronological order and at least some of the illustrated steps may be performed concurrently or in a different order than that illustrated.

The process shown in FIG. 6 begins at block 600 and then proceeds to block 602, which illustrates an AP 104 generating a target address within the coherent address space of primary coherent system 102. The target address identifies a coherent storage location to which some type of access is desired, for example, an access to obtain a query-only copy of a cache line, update or invalidate contents of a storage location identified by the target address, writeback a cache line to system memory 204, invalidate a page table entry utilized to perform address translation, etc. AP 104 additionally performs a lookup of the coherence state of the target address in AP directory 550 (block 604). AP 104 then transmits to CAPP 110 a memory access request specifying the desired access, together with the coherence state read from AP directory 550 and any associated data (block 606).

The coherence state transmitted with the AP memory access request is referred to herein as the "expected state," in that in many cases, the type of memory access request selected by AP 104 is predicated on the coherence state indicated by AP directory 550. In a preferred embodiment, AP 104 transmits the memory access request to CAPP 110 even in cases in which the expected state is or corresponds to an HPC state that, if held in an L2 cache 310, would permit the associated processor core 302 to unilaterally access the storage location identified by the target address prior to receipt of a combined response. This is the case because the coherence state determination made by AP 104 is only preliminary, with the final coherence state determination being made by CAPP 110 as described below.

In response to receipt of the AP memory access request, master table 530 of master logic 502 optionally translates the AP memory access request into an internal master request (e.g., one of the set of requests within the communication protocol specified for system fabric 206 (block 610). In a typical embodiment, the translation includes mapping the transaction type (ttype) indicated by the AP memory access request to a ttype utilized on system fabric 206. In addition, CAPP 110 determines a coherence state for the target address specified by the memory access request with respect to AP 104 (block 616). In a preferred embodiment, the coherence state is determined from multiple sources of coherence information according to a predetermined prioritization of the sources, which include (in order of increasing priority): directory 512, MMs 532 and SNMs 520. Thus, if CAPP 110 determines at block 616 that one of SNMs 520 is processing a snooped memory access request that collides with the target address, the coherence state indicated by that SNM 520 is determinative. Similarly, if CAPP 110 determines at block 616 that no SNMs 520 is active processing a request that collides with the target address, but the target address of the AP memory access request collides with the target address of a master request being processed by one of MMs 532, the coherence state indicated by that MM 532 is determinative. If the request address does not collide with an active SNM 520 or MM 532, the coherence state indicated by CAPP directory 512 is determinative.

At block 620, master logic 502 determines whether or not the expected state communicated with the AP memory access request matches the coherence state determined by CAPP 110 at block 616. If so, master logic 502 allocates an MM 532 to service the AP memory access request in an Active state in which the MM 532 begins its activities to service the AP memory access request (block 621). At block 622, the MM 532 allocated to service the AP memory access request determines whether or not servicing the AP memory access request includes initiating a memory access request on system fabric 206. If not, the process passes through page connector B to block 650, which is described further below.

If, however, MM 532 determines at block 622 that servicing the AP memory access request includes initiating a memory access request on system fabric 206, the MM 532 initiates the required memory access request on system fabric 206 on behalf of AP 104 (block 624). Within a bounded time, master logic 502 receives the combined response (Cresp) for the request (block 626), which Cresp table 534 optionally translates to an internal Cresp message (block 628) and distributes to the MM 532 that initiated the memory access request. As indicated at block 630, if the combined response indicates Retry, meaning that at least one necessary participant could not service the request (e.g., was not available to service the request or was already processing another request having an address collision with the target address), the process returns to block 616, which has been described. If, on the other hand, the combined response indicates that the request succeeded, the MM 532 that initiated request performs any data handling actions, cleanup actions, and/or directory update actions required to complete servicing the request (block 632). The data handling actions can include, for example, MM 532 receiving requested data and forwarding the data to AP 104 or transmitting data from AP 104 on system fabric 206. The cleanup actions can include, for example, MM 532 issuing one or more kill requests on system fabric 206 to invalidate one or more copies of a cache line identified by the target address cached elsewhere within data processing system 200. The directory update actions include making any coherence update required by the request to both CAPP directory 512 and AP directory 550. Thereafter, the process shown in FIG. 6 ends at block 634.

Returning to block 620, in response to a determination that the expected coherence state specified with the AP memory access request does not match the coherence state determined by CAPP 110, the process proceeds to blocks 640-644. In one embodiment in which optional blocks 640-642 are omitted, the MM 532 allocated to the service the request transmits a Failure message to AP 104. In addition to the Failure message, MM 532 optionally further indicates, with the Failure message or in a separate directory update message, the coherence state for the target address determined by CAPP 110, thus enabling AP 104 to update its AP directory 550 and to subsequently initiate an appropriate AP memory access request together with the appropriate expected state. Thereafter, the process shown in FIG. 6 ends at block 634. In this embodiment, AP 104 may require numerous requests to access the target memory block if the target memory block is highly contended by snoopers in primary coherent system 102. Accordingly, in an alternative embodiment including blocks 640-642, master logic 502 is able to increase its priority for the target memory block with respect to snoopers in primary coherent system 102 by entering a Parked state. In particular, master logic 502 determines at block 640 whether or not the coherence state mismatch detected at block 620 is due to one of SNMs 520 being active servicing a snooped memory access request that has an address collision with the target address. If not, the process proceeds to block 644, which has been described.

If, however, master logic 502 determines at block 640 that the coherence state mismatch detected at block 620 is due to one of SNMs 520 being active servicing a snooped memory access request that has an address collision with the target address, the process passes to block 642. Block 642 depicts master logic 502 allocating an MM 532 in Parked state. In the Parked state, MM 532 does not actively begin to service the AP memory access request and does not inhibit the SNM 520 that is active on the target address from completing its processing of the snooped memory access request, but does (in one embodiment) inhibit any other of the SNMs 520 and MMs 532 in the same CAPP 110 from transitioning to an active state to service a request specifying an address that collides with the target address of the AP memory access request. The allocated MM 532 remains in the Parked state until the SNM 520 that is active servicing the conflicting snooped memory access request transitions to an Idle state, and in response to this transition, itself transitions from the Parked state to an Active state. The process then passes to block 616 and following blocks, which have been described. Returning to block 616 ensures that the SNM 520 that was active on the target address did not change the CAPP coherence state from the expected state.

In at least some embodiments, the allocation of an MM 532 in the Parked state does not absolutely inhibit any other of the SNMs 520 and MMs 532 in the same CAPP 110 from transitioning to an active state. Instead, the effects of a MM 532 in the Parked state (and/or an active state) on the dispatch of other SNMs 520 and MMs 532 to service selected types of conflicting requests can be varied, for example, via program control (i.e., via execution of an appropriate CAPP control instruction by one of processor cores 302 or AP 104) of the composite coherence state determination described above with reference to block 616. For example, to eliminate unnecessary traffic on system fabric 206, dispatcher 516 can be permitted by programmable control to dispatch a SNM 520 in an active state to service a snooped BKill request that invalidates the target memory block of a conflicting request being handled by a MM 532 in the Parked state or an active state. In cases in which another machine is dispatched to service a conflicting request while a MM 532 is in the Parked state, the MM 532 in the Parked state re-enters the Parked state when the process of FIG. 6 proceeds along the path from block 642 to blocks 616, 620, 640 and returns to block 642. Master logic 502 further preferably implements a counter to bound the number of times a MM 532 is forced to re-enter the Parked state in this manner for a single AP request. When a threshold value of the counter is reached, the dispatch of other SNMs 520 and MMs 532 to service conflicting requests is then inhibited to permit the MM 532 to exit the Parked state and manage servicing of its AP request.

Referring now to block 650, in response to determining the servicing the AP memory access request does not require issuing a memory access request on system fabric 206, MM 532 updates the CAPP directory 512 as indicated by the AP memory access request. MM 532 then transmits a Success message to AP 104 to confirm the update to CAPP directory 512. The process thereafter terminates at block 632.

Figure 7:
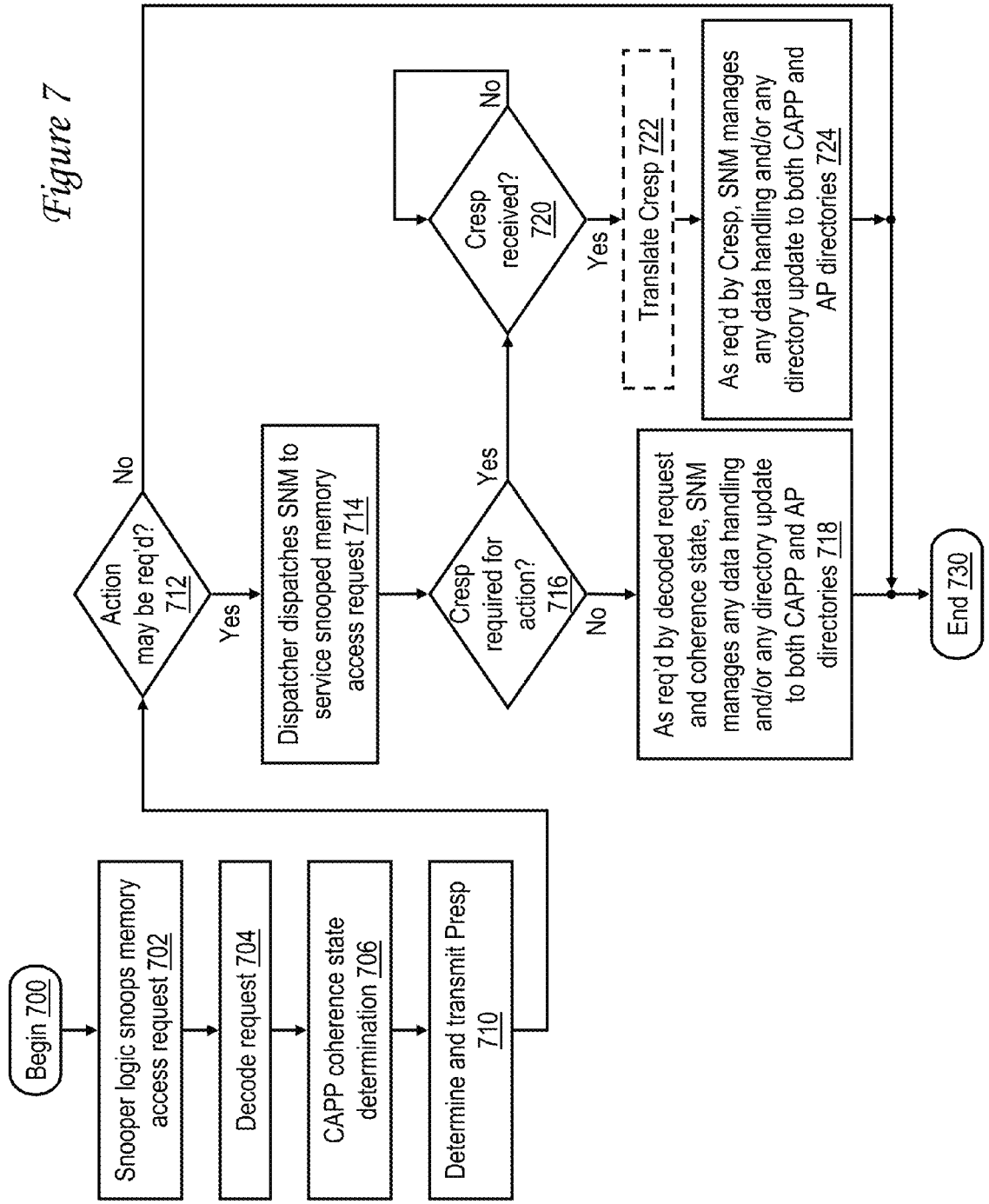
FIG. 7 is a high level logical flowchart of an exemplary process by which a CAPP coherently handles a snooped memory access request in accordance with one embodiment.

With reference now to FIG. 7, there is illustrated a high level logical flowchart of an exemplary process by which a CAPP 110 coherently handles a snooped memory access request in accordance with one embodiment. The illustrated process begins at block 700 and then proceeds to block 702, which depicts snooper logic 500 of CAPP 110 receiving a memory access request on system fabric 206 via interconnect logic 320. At block 704, decoder 510 decodes the snooped memory access request to determine the type of the request. In addition, at block 706, CAPP 110 determines a coherence state for the address referenced by the snooped memory access request, for example, utilizing the methodology previously described with reference to block 616.

Based on the decoded type of the snooped memory access request as determined at block 704 and the coherence state for the referenced address as determined at block 706, snoop table 514 determines and transmits on system fabric 206 a partial response representing the coherence response of AP 104 to the snooped memory access request (block 710).

Referring now to block 712, dispatcher 516 of snooper logic 500 determines based on the partial response determined at block 710 and the decoded memory access request whether or not further action by CAPP 110 may be required to service the snooped memory access request. In general, if the coherence state determined at block 706 is Invalid, meaning that AP cache 106 does not hold a valid copy of the memory block identified by the referenced memory address, no further action on the part of CAPP 110 or AP 104 is required to service the snooped memory access request. If the coherence state determined at block 706 is other than Invalid, at least some additional action may be required on the part of CAPP 110 and/or AP 104 to service the snooped memory access request.

In response to a negative determination at block 712, the process depicted in FIG. 7 ends at block 730. If, however, dispatcher 516 determines at block 712 that further action by CAPP 110 and/or AP 104 may be required to service the snooped memory access request, dispatcher 516 dispatches one of SNMs 520 to manage any action required to service the snooped memory access request (block 714). At block 716, the dispatched SNM 520 determines whether the action required to service the snooped memory access request can be determined without the combined response representing the systemwide coherence response to the memory access request or whether the combined response is required to determine the action required to appropriately service the snooped memory access request. In response to a determination at block 716 that the combined response is not required to determine the action to perform to service the snooped memory access request, the dispatched SNM 520 manages performance of any data handling and/or directory update actions required by the decoded memory access request and coherence state to service the memory access request (block 718). Thereafter, the process illustrated in FIG. 7 ends at block 730.

In response to a determination at block 716 that the combined response is required to determine the action to be performed to service the snooped memory access request, the dispatched SNM 520 waits for the combined response, as shown at block 720. In response to receiving the combined response, Cresp table 534 optionally translates the combined response into an internal Cresp message employed by CAPP 110 (block 722). The dispatched SNM 520 then manages performance of any data handling and/or directory update actions required by the combined response to service the memory access request (block 724). Thereafter, the process illustrated in FIG. 7 ends at block 730.

Figure 8:
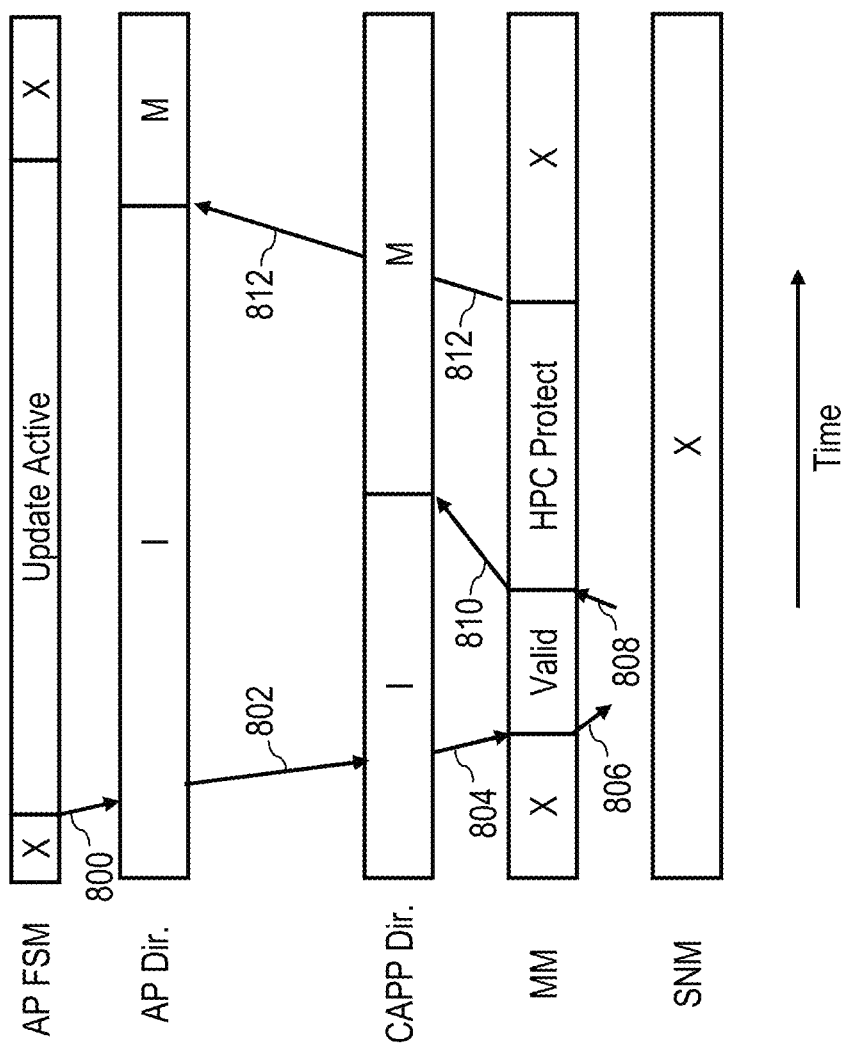
FIG. 8 is a first time-space diagram of an exemplary processing scenario in which an AP requests to coherently update a memory block within the primary coherent system to which it is attached.

Referring now to FIG. 8, there is depicted a first time-space diagram of an exemplary processing scenario in which an AP 104 requests to coherently update a memory block within the primary coherent system 102 to which it is attached. For purposes of illustration, the exemplary processing scenario given in FIG. 8 and other similar figures will be described with reference to the illustrative hardware embodiments given in FIGS. 2-3 and 5.

As the exemplary processing scenario begins, an AP 104 processes a command (e.g., a software or firmware instruction executed within AP 104) specifying an update to a memory block identified by a target address within the coherent address space of primary coherent system 102. In response to the command, AP 104 allocates one of its idle finite state machines (FSMs) to manage performance of the command and performs a lookup of the target address in AP directory 550, as indicated by arrow 800. The AP FSM transitions from an idle state (indicated by "X") to an Update Active state and, based on a determination that the target address has an Invalid coherence state with respect to AP directory 550, transmits to CAPP 110 an update request with an expected state of Invalid, as shown at reference numeral 802.

In response to receipt from AP 104 of the update request, CAPP 110 translates the AP update request into a RWITM request, which as indicated in Table I, is one of the set of requests within the communication protocol specified for system fabric 206. In addition, CAPP 110 determines a coherence state for the target address specified by the memory access request. Because in this case, the target address of the RWITM request does not collide with an address that an MM 532 or SNM 520 is currently processing, the coherence state of the target address for CAPP 110 is determined by CAPP directory 512, which returns Invalid.

The previously idle MM 532 allocated to service the RWITM request, in response to determining a coherence state match between the expected state and the coherence state determined by CAPP 110, transitions to a Valid state and initiates the RWITM request on system fabric 206 as shown at reference numeral 806. The RWITM request requests a copy of the target memory block and further requests invalidation of all other cached copies of the memory block (to permit AP 104 to modify the memory block). Within a bounded time, MM 532 receives a combined response indicating success of the RWITM request, as indicated at reference numeral 808. MM 532 also receives a copy of the requested memory block, possibly prior to, concurrently with, or after the combined response.

In response to receiving the combined response indicating success of the RWITM request, MM 532 transitions to the HPC Protect state, thus initiating a protection window 413 for the target address. In addition, as indicated by arrow 810, MM 532 updates the coherence state for the target address in CAPP directory 512 to Modified. In addition, as indicated by arrow 812, MM 532 transmits the copy of the requested memory block and a Complete message to AP 104. Thereafter, MM 532 returns to the Idle state. In response to receipt of the requested memory block and Complete message, the AP FSM directs the requested update to the target memory block, storage of the updated target memory block in data array 552, and update of the coherence state for the target address in AP directory 550 to Modified. The updates to AP cache 106 are performed asynchronously to the update to CAPP directory 512, and due to the possibly unreliable connection provided by communication link 210, may require CAPP 110 to retransmit the Complete message one or more times. Thereafter, the AP FSM returns to the Idle state.

It can also be appreciated by reference to FIG. 8 that (depending on the presence or absence of other colliding requests) the processing of a read request of AP 104 could be handled similarly to the illustrated processing scenario, with the following exceptions: the AP FSM would assume the Read Active state rather than the Update Active state, MM 532 would assume the Shared Protect state following receipt of the combined response indicated by arrow 808 rather than the HPC Protect state, and CAPP directory 512 and AP directory 550 would be updated to the Shared state rather than the Modified State.

Figure 9:
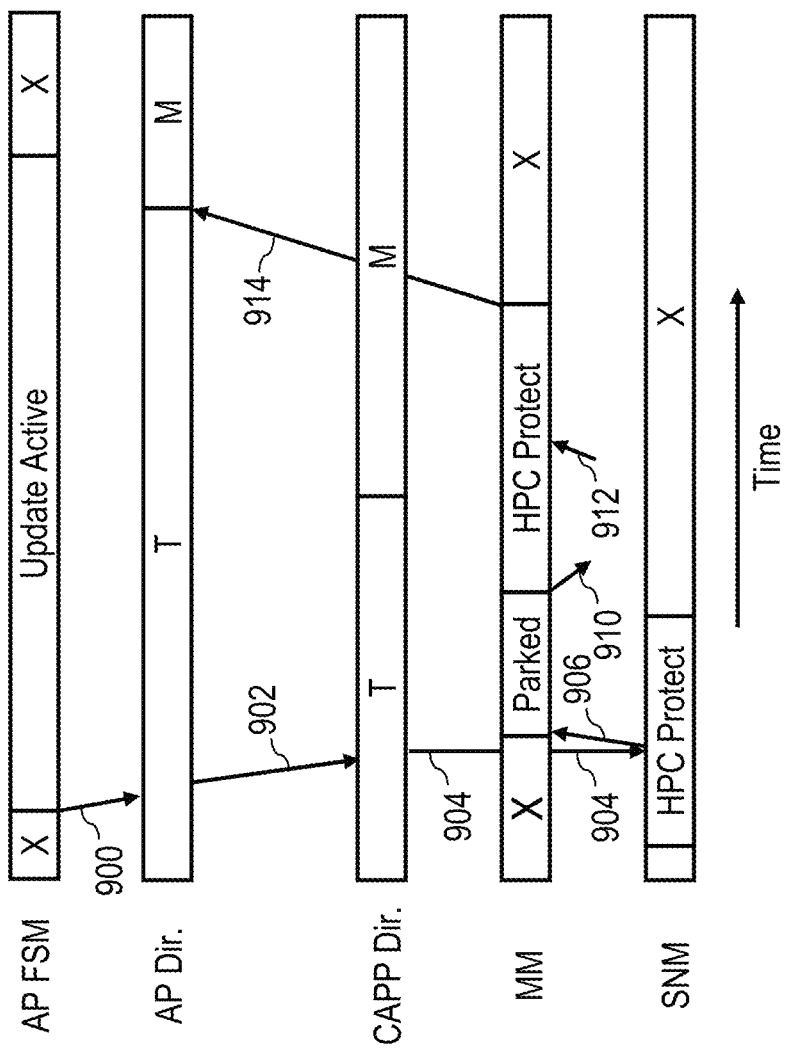
FIG. 9 is a second time-space diagram of an exemplary processing scenario in which an AP requests to coherently update a memory block within the primary coherent system to which it is attached.

With reference now to FIG. 9, there is depicted a second time-space diagram of an exemplary processing scenario in which an AP 104 requests to coherently update a memory block within the primary coherent system 102 to which it is attached.

As the exemplary processing scenario begins, an AP 104 processes a command (e.g., a software or firmware instruction executed within AP 104) specifying an update to a memory block identified by a target address within the coherent address space of primary coherent system 102. In response to the command, AP 104 allocates one of its idle finite state machines (FSMs) to manage performance of the command and performs a lookup of the target address in AP directory 550, as indicated by arrow 900. The AP FSM transitions from an Idle state (indicated by "X") to an Update Active state and, based on a determination that the target address has an Shared-Owner (T) coherence state with respect to AP directory 550, transmits to CAPP 110 an update request with an expected state of T, as shown at reference numeral 902.

In response to receipt from AP 104 of the update request, CAPP 110 translates the update request to a BKill request. As described above with reference to Table I, the BKill request requests invalidation of all other cached copies of the memory block to permit AP 104 to modify its existing HPC copy of the target memory block. CAPP 110 additionally determines a coherence state for the target address specified by the update request with respect to CAPP 110, as shown at reference numeral 904. Because in this case, the target address of the update request collides with an address that a SNM 520 is currently processing, the state of that SNM 520 is determinative, meaning that CAPP 110 determines an HPC Protect state. Thus, the coherence state determined by CAPP 110 does not match the expected state. In embodiments in which the optional functionality described above with reference to blocks 640-642 of FIG. 6 is not implemented, CAPP 110 would respond to the update request by transmitting a Failure message to AP 104. However, in the illustrated case in which the optional functionality described above with reference to blocks 640-642 of FIG. 6 is implemented, CAPP 110 allocates an idle MM 532 to service the BKill request in the Parked state, as indicated by arrow 906. As noted above, the Parked state of the MM 532 inhibits any other SNM 520 from transitioning to an active state to service a snooped memory access request for the target address.

In response to the SNM 520 that is active working on the conflicting address transitioning to the Idle state without modifying the matching T coherence state in CAPP directory 512 (e.g., as would be the case if the snooped memory access request is a Read request), the MM 532 verifies that the coherence state determined for CAPP 110 (which is the T state recorded in CAPP directory 512 in the absence of a SNM 520 or MM 532 active on a conflicting address) matches the expected state, as discussed previously with reference to block 616 of FIG. 6. In response to verifying that the coherence state of CAPP directory 110 matches the expected state, the MM 532 allocated to service the BKill request transitions to the HPC Protect state (thus initiating a protection window 413 for the target address) and initiates the BKill request on system fabric 206 as shown at reference numeral 910. In other scenarios (not illustrated) in which SNM 520 modifies the coherence state in CAPP directory 512 (e.g., as would be the case if the snooped memory access request is a RWITM request), MM 532 instead returns a failure message to AP 104 and returns to the Idle state.

Returning to the scenario shown in FIG. 9, in response to the BKill request, MM 532 receives a combined response indicating success of the BKill request, as indicated at reference numeral 912. In response to receiving the combined response indicating success of the BKill request, MM 532 updates the coherence state for the target address in CAPP directory 512 to Modified. In addition, as indicated by arrow 914, MM 532 transmits a Complete message to AP 104. Thereafter, MM 532 returns to the Idle state. In response to receipt of the Complete message, the AP FSM directs the update of the coherence state for the target address in AP directory 550 from T to Modified and the update of the corresponding cache line in AP data array 552. Thereafter, the AP FSM returns to the Idle state.

Figure 10:
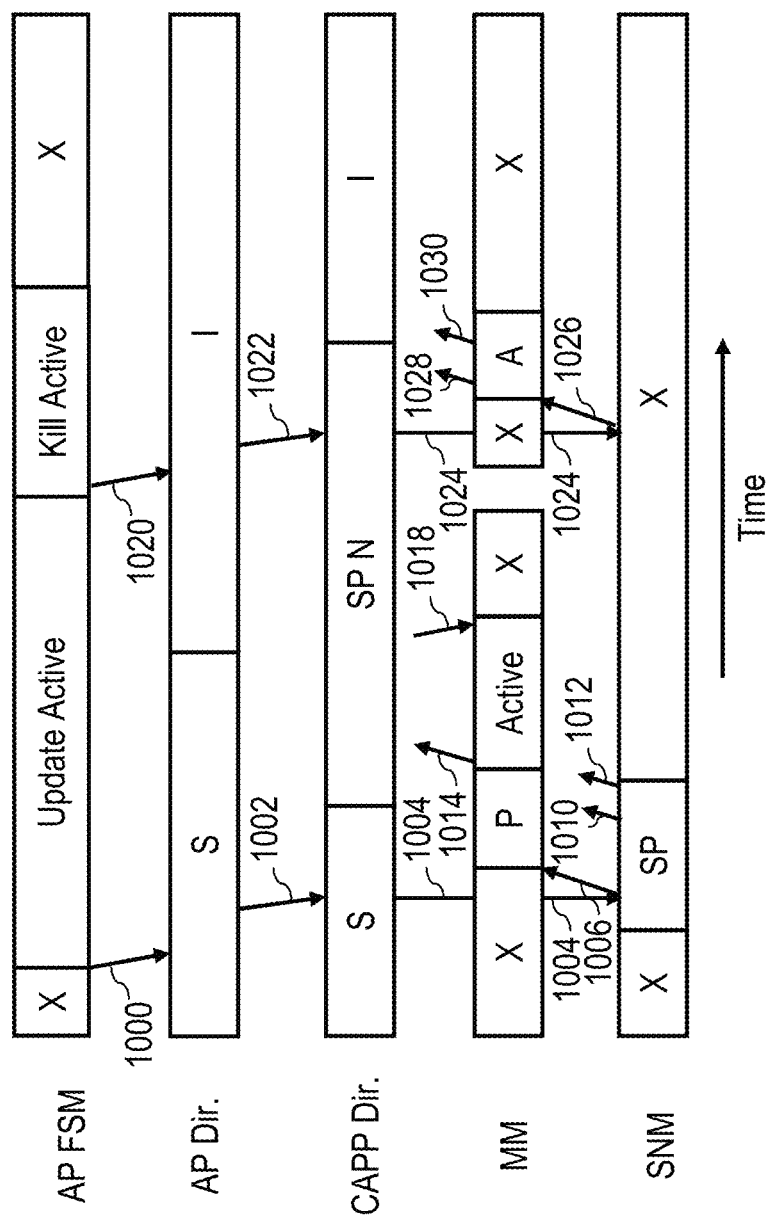
FIG. 10 is a third time-space diagram of an exemplary processing scenario in which an AP requests to coherently update a memory block within the primary coherent system to which it is attached.

Referring now to FIG. 10, there is depicted a third time-space diagram of an exemplary processing scenario in which an AP 104 requests to coherently update a memory block within the primary coherent system 102 to which it is attached.

As the exemplary processing scenario shown in FIG. 10 begins, an AP 104 processes a command (e.g., a software or firmware instruction executed within AP 104) specifying an update to a memory block identified by a target address within the coherent address space of primary coherent system 102. In response to the command, AP 104 allocates one of its idle finite state machines (FSMs) to manage performance of the command and performs a lookup of the target address in AP directory 550, as indicated by arrow 1000. The AP FSM transitions from an Idle state (indicated by "X") to an Update Active state and, based on a determination that the target address has an Shared (S) coherence state with respect to AP directory 550, transmits to CAPP 110 an update request with an expected state of S, as shown at reference numeral 1002.

In response to receipt from AP 104 of the update request, CAPP 110 translates the update request to a DClaim request. As described above with reference to Table I, the DClaim request requests invalidation of all other cached copies of the target memory block to permit AP 104 to modify its existing Shared copy of the target memory block. CAPP 110 additionally determines a coherence state for the target address specified by the update request with respect to CAPP 110, as shown at reference numeral 1004. Because in this case, the target address of the update request collides with an address of a snooped DClaim request that a SNM 520 is currently processing, the state of that SNM 520 is determinative, meaning that CAPP 110 determines the Shared Protect (SP) state. Thus, the coherence state determined by CAPP 110 does not match the expected state of Shared (see, e.g., block 620 of FIG. 6). Consequently, CAPP 110 allocates an idle MM 532 to the DClaim request in the Parked (P) state, as illustrated by arrow 1006 and as previously described with reference to block 642 of FIG. 6.

In response to the snooped DClaim request, the SNM 520 that is active working on the snooped DClaim request updates the coherence state of the target address in CAPP directory 512 to the Shared Protect Noted state, as indicated by arrow 1010, and additionally transmits a Kill message to AP 104 to cause the coherence state in AP directory 550 to be updated to the Invalid state, as indicated by arrow 1012. As shown in FIG. 10, the SNM 520 thereafter returns to the Idle state.

In response to the SNM 520 returning to the Invalid state, the MM 532 allocated to the DClaim request transitions from the Parked state to an active state and again determines the coherence state of the target memory address with respect to CAPP 110, as described above with reference to block 616 of FIG. 6. Because the Parked state inhibits the dispatch of any other SNM 520 to service a conflicting address, the coherence state specified by CAPP directory 512 (i.e., Shared Protect Noted) is determinative of the coherence state of the target memory address with respect to CAPP 110. In response to detecting a mismatch of the coherence state in CAPP directory 512 (Shared Protect Noted) with the expected state (Shared), the MM 532 provides a Failure message to AP 104 to indicate failure of the DClaim request of AP 104, as indicated by arrow 1014.

Due to the potential unreliability of communication link 210, the invalidation in AP directory 550 initiated by SNM 520 is preferably confirmed by receipt of MM 532 of a full handshake from AP 104 as indicated by arrow 1018. If MM 532 does not receive a handshake from AP 104 confirming invalidation of the target memory address in AP directory 550 within a predetermined time period, MM 532 preferably retries a Kill message until the handshake is returned by AP 104 or a failure threshold is reached. In response to receipt of the handshake from AP 104, the MM 532 allocated to the DClaim request returns to the Idle state.

As will be appreciated, in an alternative embodiment, CAPP 110 can instead accommodate for the possible unreliability of communication link 210 by leaving the SNM 520 allocated to service the conflicting DClaim request in the Shared Protect state until the SNM 520 receives the handshake from AP 104. However, this alternative embodiment consumes more resources in that it requires both the SNM 520 and MM 532 to remain active for longer periods of time, thus reducing the availability of resources to service other memory access requests received from AP 104 or snooped on system fabric 206.

The AP FSM, in response to receiving Kill message 1012, transitions from the Update Active state to a Kill Active state, reflecting a need to invalidate the target memory block in CAPP directory 512. Accordingly, the AP FSM performs a lookup in AP directory 550 (as indicated by arrow 1020) transmits a Kill request 1022 to CAPP 110 specifying the same target memory address as its earlier update request and indicating an expected coherence state of Shared Protect Noted (which the AP FSM received in Kill message 1012). In response to the Kill request, master logic 502 again determines the coherence state of the target memory address with respect to CAPP 110 as described above with respect to block 616 of FIG. 6, and as indicated in FIG. 10 by arrow 1024. In response, to determining that the coherence state of the target memory address with respect to CAPP 110 (i.e., the Shared Protect Noted state indicated by CAPP directory 512) matches the expected state indicated by AP 104, master logic 502 allocates a MM 532 (which could be the same MM 532 or a different MM 532) in an Active (A) state to service the AP Kill request, as illustrated by arrow 1026 and described above with reference to block 621 of FIG. 6. Because the Kill request does not require a memory access request to be issued on system fabric 206, the MM 532 updates the CAPP directory 512 as indicated by the AP memory access request, as described above with reference to block 650 of FIG. 6, in this case by invalidating the target memory address in CAPP directory 512. This update to CAPP directory 512 is illustrated in FIG. 10 by arrow 1028. On completion of the update to CAPP directory 512, MM 532 also transmits a Success message to AP 104 to confirm the update to CAPP directory 512, as indicated in FIG. 10 by arrow 1030 and as described above with respect to block 652 of FIG. 6.

After the scenario illustrated in FIG. 10, the processing scenario illustrated in FIG. 8 can be performed in order to allow AP 104 to update the target memory block of primary coherent system 102.

Figure 11:
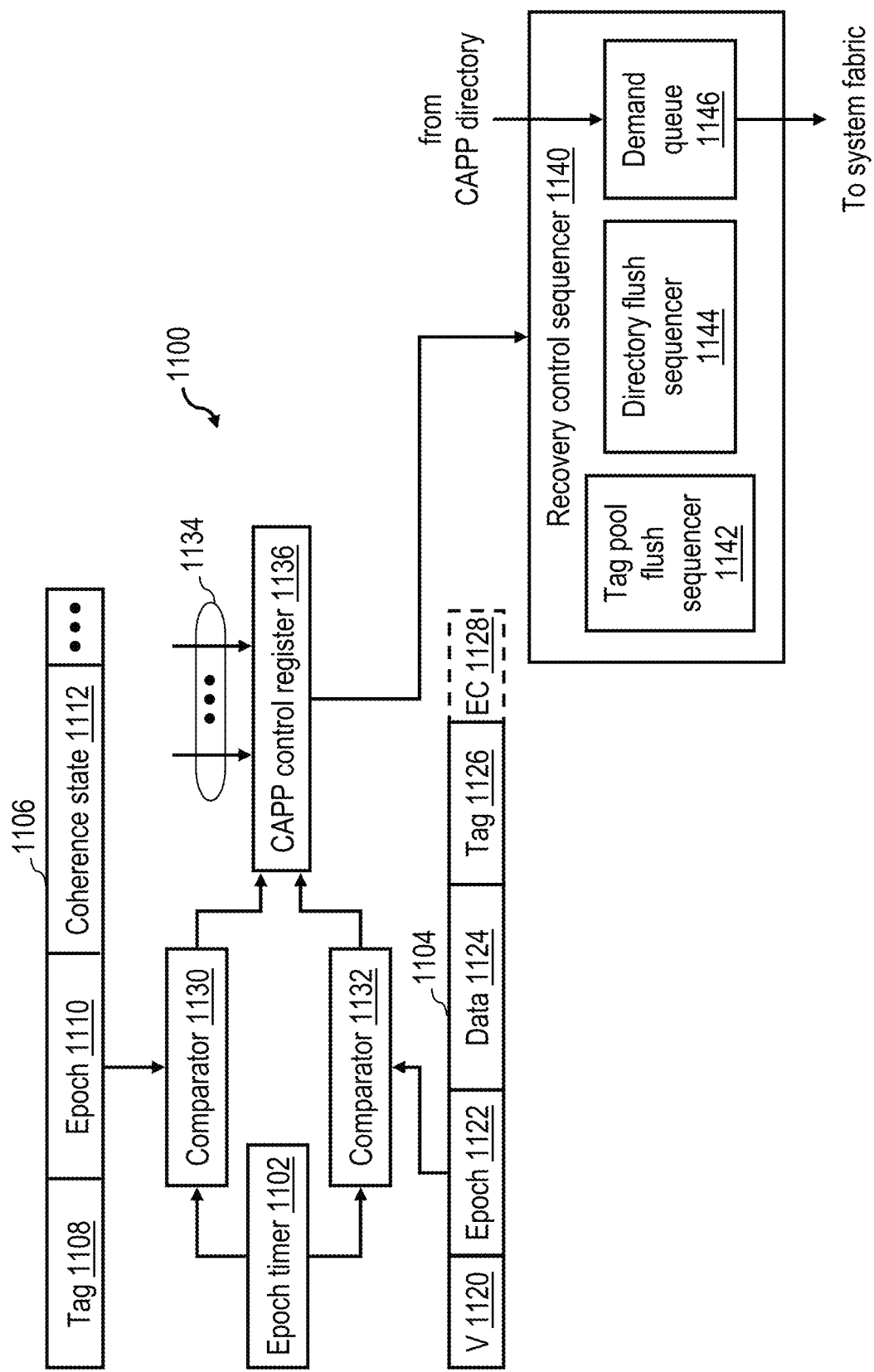
FIG. 11 is a more detailed view of recovery circuitry within the CAPP of FIG. 5 in accordance with one embodiment.

As noted previously, in many implementations, AP 104 and/or the communication link 108 by which AP 104 is coupled to primary coherent system 102 is generally less reliable than CAPP 110 and/or the remainder of primary coherent system 102. To prevent a failure of communication link 108 and/or AP 104 (and/or CAPP 110) from causing problems within primary coherent system 102 (including a logical partition crash or system crash), primary coherent system 102 is preferably equipped with recovery circuitry to detect such failures and to perform appropriate recovery processes. FIG. 11 illustrates exemplary recovery circuitry 1100 that may conveniently be implemented within CAPP 110 of FIG. 5 in accordance with one embodiment.

As shown in FIG. 11, recovery circuitry 1100 includes a epoch timer 1102. In one embodiment, epoch timer 1102 is a free running counter (e.g., a 2-bit counter) having a plurality of count values each defining an epoch of operation of CAPP 110. The count value of epoch timer 1102 is preferably updated at a low frequency relative to the base clock frequency of CAPP 110, meaning that, under normal operation, AP requests and snooped requests received by CAPP 110 are expected to be serviced within a small number of epochs (e.g., 2 epochs). To detect whether or not a failure of AP 104 and/or communication link 108 has occurred (and recovery processing is required), CAPP 110 preferably stores in association with each entry 1104 in tag pool 540 and each directory entry 1106 of CAPP directory 512 the epoch for that entry.

FIG. 11 shows an exemplary implementation in which each directory entry 1106 of CAPP directory 512 includes an address tag field 1108 specifying a tag portion of a real memory address for the associated cache line held in data array 552, an epoch field 1110 indicating the epoch during which that directory entry 1106 was last updated (i.e., allocated or subsequently modified), and a coherence state field 1112 indicating a coherence state for the associated cache line in data array 552. Similarly, FIG. 11 illustrates that each entry 1104 of tag pool 540 includes a valid bit 1120, a data field 1124 for buffering incoming or outgoing data, a tag field 1126 identifying with destination tag(s) one or more destinations for the data buffered in data field 1124, and an epoch field 1122 that indicates the epoch during which that entry 1104 was allocated. As indicated by dashed line illustration, entry 1104 may optionally further include an error control (EC) bit 1128 signifying that the data within data field 1124 is sensitive to errors (e.g., hypervisor data, operating system data, system configuration data, etc.). AP 104 or CAPP 110 may determine data to be transmitted to a destination in primary coherent system 102 is sensitive to errors and accordingly cause tag pool 540 to set the EC bit 1128 of the relevant entry 1104, for example, by reference to a memory map or address range registers configured by a hypervisor.

Recovery circuitry 1100 further includes comparators 1130 and 1132, which detect failures of AP 104 and/or communication link 108 by reference to the epoch specified by epoch timer 1102. For example, in one embodiment, when a directory entry 1106 in CAPP directory 512 is read in response to a snooped request for which snoop table 514 directs an epoch check to be performed, comparator 1130 determines whether a difference between a current value of epoch timer 1102 and the epoch field 1110 of the directory entry 1106 satisfies a first threshold number of epochs (e.g., 3 epochs). If so, comparator 1130 sets a directory failure bit in CAPP control register 1136 to indicate detection of a failure by reference to CAPP directory 512.

To prevent erroneous detection of a failure, snoop table 514 preferably directs an epoch check to be performed by comparator 1130 only for directory entries 1106 of CAPP directory 512 for which a long duration without update is known to indicate a failure. For example, directory entries 1106 having a "temporary" coherence state (e.g., the Shared Protect Noted state illustrated in FIG. 10) are expected to be quickly updated to other coherence states, for example, in response to a request by AP 104 (e.g., Kill request 1022). The absence of an update from a temporary coherence state within the first threshold number of epochs thus serves as a reliable indication that AP 104 and/or communication link 108 has failed.

Comparator 1132 similarly determines by reference to the epoch fields 1122 of all of the entries 1104 of tag pool 540 and the current value of epoch timer 1102 whether or not any data transfer between AP 104 and primary coherent system 102 via CAPP 110 has been outstanding for a second threshold number of epochs (e.g., 3 epochs). In response to comparator 1132 detecting that at least one data transfer has been outstanding for at least the second threshold number of epochs, comparator 1132 sets a tag pool failure bit in CAPP control register 1136 to indicate detection of a failure by reference to tag pool 540. It should be appreciated that in various embodiments the frequency at which epoch timer 1102 is updated and the first and second threshold numbers of epochs can all be programmable and that the first and second thresholds can differ.

As further illustrated in FIG. 11, CAPP control register 1136 is further coupled to receive a plurality of additional inputs 1134. One or more of these additional inputs 1134 can also be utilized to set one or more bits within CAPP control register 1134 signifying detection of a failure of AP 104 and/or communication link 108.

Recovery circuitry 1100 further includes a recovery control sequencer 1140 that controls the performance of recovery operations for CAPP 110 in response to CAPP control register 1136 indicating a failure of AP 104 and/or communication link 108. Recovery control sequencer 1140 includes a tag pool flush sequencer 1142 that manages the flushing of entries 1104 of tag pool 540 and a directory flush sequencer 1144 that manages the flushing of directory entries 1106 of CAPP directory 512. In at least one embodiment, tag pool flush sequencer 1142 can conveniently be implemented within tag pool 540, and directory flush sequencer 1144 can conveniently be implemented within CAPP directory 512. As described further below, directory flush sequencer 1124 has an associated demand queue 1146 that accelerates the flushing of directory entries 1106 accessed during a directory flush process by snooper logic 500 in response to memory access requests snooped on system fabric 206.

Figure 12:
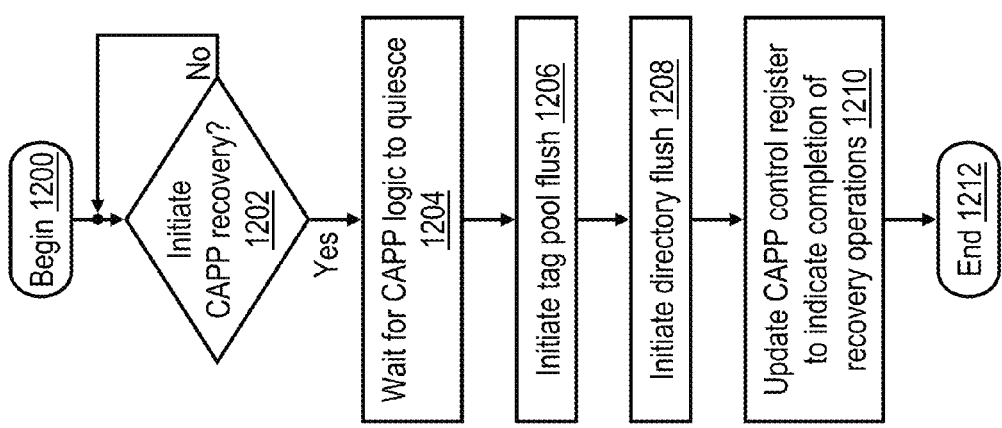
FIG. 12 is a high level logical flowchart of an exemplary process by which the recovery control sequencer of FIG. 11 directs recovery processing in a CAPP in accordance with one embodiment.

Referring now to FIG. 12, there is depicted a high level logical flowchart of an exemplary process by which the recovery control sequencer 1140 of FIG. 11 directs recovery processing in a CAPP 110 in accordance with one embodiment. The process shown in FIG. 12 begins at block 1200 and then proceeds to block 1202, which depicts recovery control sequencer 1140 determining whether or not recovery processing by CAPP 110 should been initiated, for example, by reference to one or more bits in CAPP control register 1136 that indicate a failure of AP 104 and/or communication link 108. In response to a determination that recovery processing by CAPP 110 should be initiated, master logic 502 of CAPP 110 ignores all further commands received from AP 104, and snooper logic 500 refrains from dispatching SNMs 520 in response to requests on system fabric 206. The process proceeds from block 1202 to block 1204, which illustrates recovery control sequencer 1140 waiting for logic within CAPP 110 to quiesce prior to initiating further recovery processing. For example, at block 1204, recovery control sequencer 1140 may wait for all active MMs 532 and SNMs 520 to return to an Idle state and for all state machines in tag pool 540 that are working on entries 1104 from which data has already been delivered to primary coherent system 102 to return to an Idle state. Following block 1204, recovery control sequencer 1140 initiates flush processing of tag pool 540 by tag pool flush sequencer 1142 as described in detail below with reference to FIG. 13 (block 1206). In addition, recovery control sequencer 1140 initiates directory flush processing of CAPP directory 512 by directory flush sequencer 1144 as described below with reference to FIG. 14-15 (block 1208). Although not required, the steps depicted at blocks 1206 and 1208 are preferably performed in the indicated order, but could alternatively be performed in parallel. Following completion of recovery processing by tag pool flush sequencer 1142 and directory flush sequencer 1144, recovery control sequencer 1140 updates CAPP control register 1136 to indicate completion of recovery operations (block 1210). Thereafter, the process of FIG. 12 terminates at block 1212.

Figure 13:
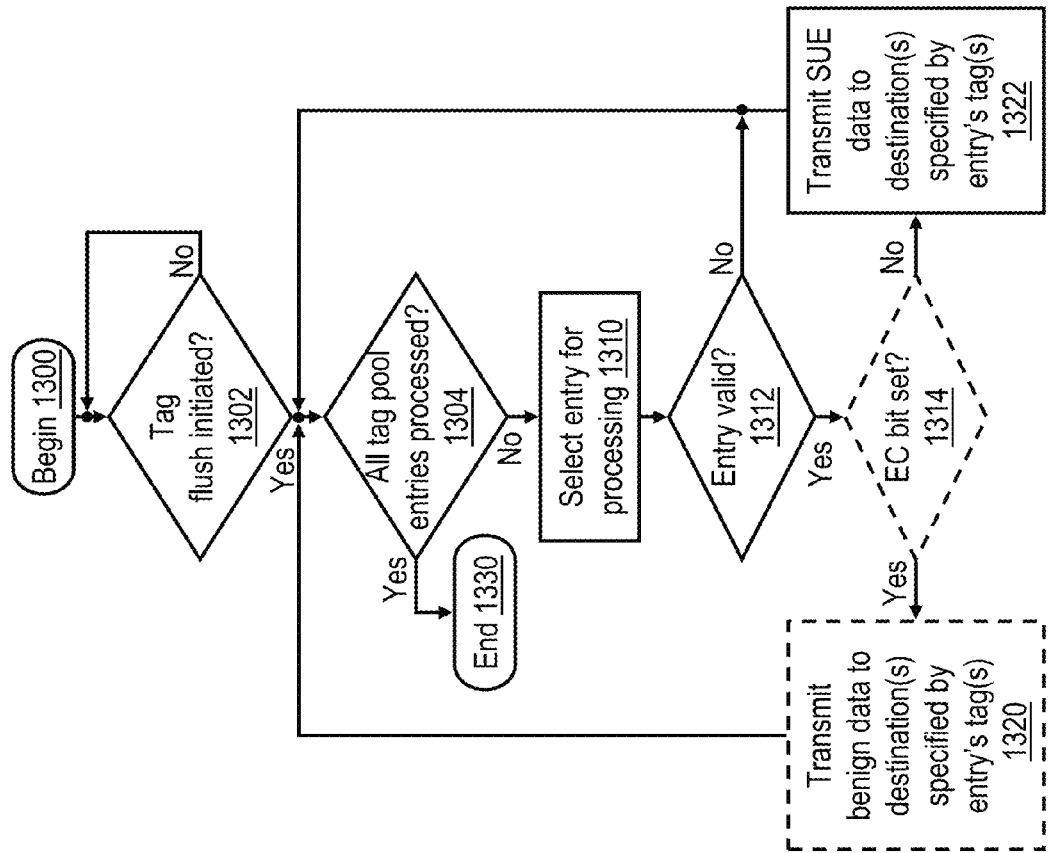
FIG. 13 is a high level logical flowchart of an exemplary tag flush process by which a CAPP implements data recovery in accordance with one embodiment.

With reference now to FIG. 13, there is illustrated a high level logical flowchart of exemplary flush processing by which tag pool flush sequencer 1142 of CAPP 110 implements data recovery in accordance with one embodiment. As illustrated, the process begins at block 1300 and thereafter proceeds to block 1302, which depicts tag pool flush sequencer 1142 awaiting initiation of tag pool flush processing by recovery control sequencer 1140, as illustrated at block 1206 of FIG. 12. In response to the initiation of tag pool flush processing by recovery control sequencer 1140, tag pool flush sequencer 1142 determines at block 1304 whether or not all entries 1104 of tag pool 540 have been processed according to the flush process of FIG. 13. If so, the tag flush process of FIG. 13 ends at block 1330. If, however, tag pool flush sequencer 1142 determines at block 1304 that not all entries 1104 of tag pool 540 have been processed, the process proceeds to block 1310.

Block 1310 illustrates tag pool flush sequencer 1142 selecting an entry 1104 of tag pool 540 for processing (e.g., the next sequential entry of tag pool 540). At block 1312, tag pool flush sequencer 1142 determines whether or not valid bit 1120 of the selected entry 1104 indicates the selected entry 1104 is valid. If not, no action is required, and the process returns to block 1304, which has been described. If, however, tag pool flush sequencer 1142 determines at block 1312 that the selected entry 1104 is valid and if optional EC bit 1128 is implemented within the entries 1104 of tag pool 540, tag pool flush sequencer 1142 additionally determines at block 1314 whether or not the EC bit 1128 of the selected entry 1104 is set to indicate the data within data field 1124 of the selected entry 1104 is sensitive to errors. In response to a determination at block 1314 that the EC bit 1128 of the selected entry 1104 is set, tag pool flush sequencer 1142 initiates on system fabric 206 of primary coherent system 102 transmission a data value suited to the sensitivity indicated by the setting of EC bits 1128 to the destination(s) in primary coherent system 102 indicated by the destination tag(s) in the tag field 1126 of the selected entry 1104 (block 1320). Such a sensitivity may be, for example, a catastrophic reaction to special uncorrectable error (SUE) data in the case of the hypervisor, requiring instead transmission of an benign data value. Following block 1320, the process returns to block 1304, which has been described. Referring again to blocks 1312-1314, if optional EC bit 1128 is not implemented within the entries 1104 of tag pool 540 or if the EC bit 1128 of the selected entry 1128 is not set, then tag pool flush sequencer 1142 initiates on system fabric 206 of primary coherent system 102 transmits a "poisoned" data value signifying a special uncorrectable error (SUE) to the destination(s) in primary coherent system 102 indicated by the destination tag(s) in the tag field 1126 of the selected entry 1104 (block 1322). Thereafter, the process shown in FIG. 13 returns to block 1304, which has been described.

Figure 14:
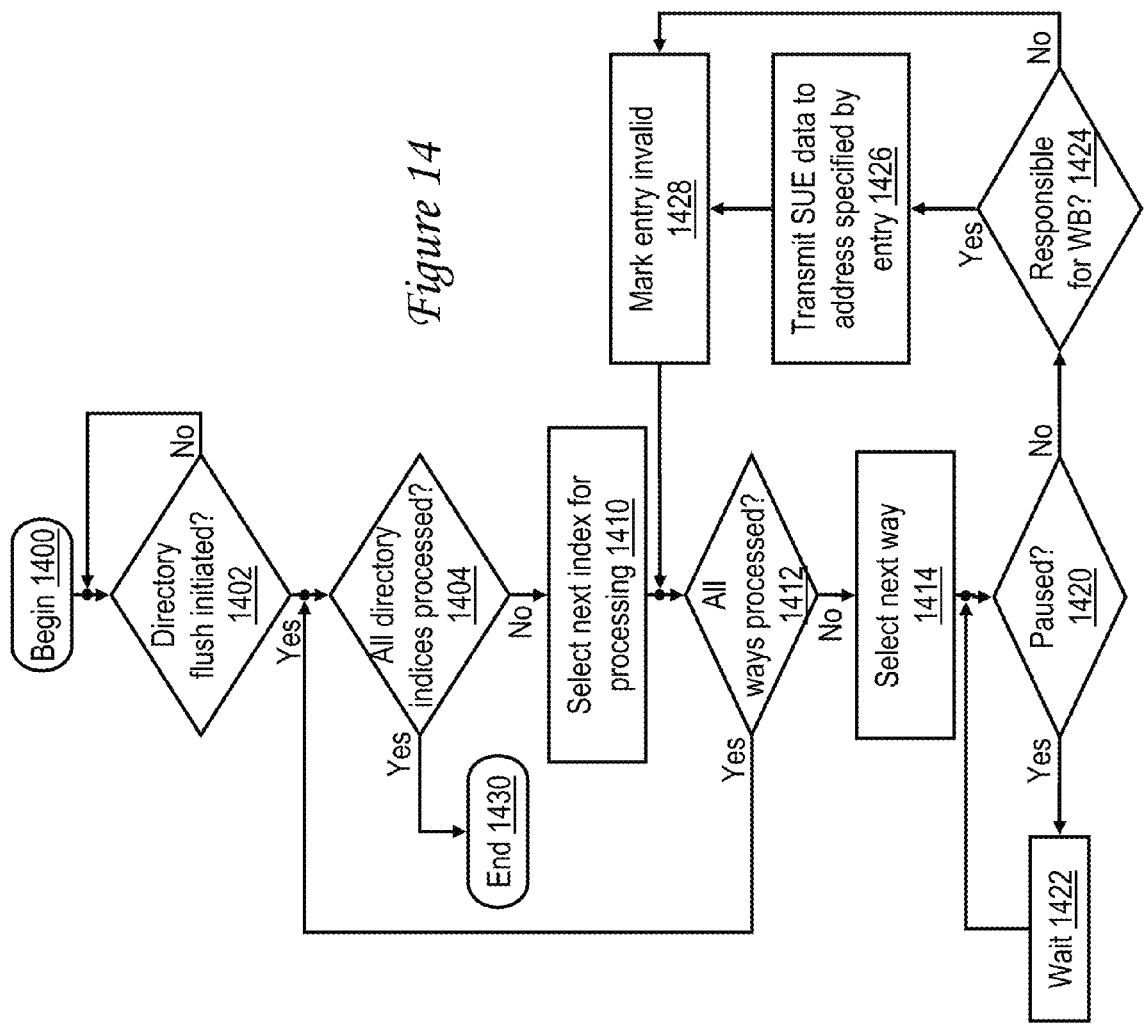
FIG. 14 is a high level logical flowchart of an exemplary directory flush process by which a CAPP implements coherence state recovery in accordance with one embodiment.

Referring now to FIG. 14, there is depicted a high level logical flowchart of an exemplary directory flush process by which directory flush sequencer 1144 of CAPP 110 implements coherence state recovery in accordance with one embodiment. As depicted, the process begins at block 1400 and thereafter proceeds to block 1402, which depicts directory flush sequencer 1144 awaiting initiation of directory flush processing by recovery control sequencer 1140, as illustrated at block 1208 of FIG. 12. In response to the initiation of directory flush processing by recovery control sequencer 1140, directory flush sequencer 1144 determines at block 1404 whether or not all indices into CAPP directory 512 have been processed according to the directory flush process of FIG. 14. If so, the directory flush process of FIG. 14 ends at block 1430. If, however, directory flush sequencer 1144 determines at block 1404 that not all indices into CAPP directory 512 have been processed, the process proceeds to block 1410.

Block 1410 depicts directory flush sequencer 1144 selecting a next directory index for processing. In one embodiment, the selection shown at block 1410 includes sequentially advancing the index. Directory flush sequencer 1144 additionally determines at block 1412 if all ways in the congruence class of CAPP directory 512 identified by the selected index have been processed. If so, the process returns to block 1404, which has been described. If, however, directory flush sequencer 1144 determines at block 1412 that not all ways of the congruence class of CAPP directory 512 identified by the selected index have been processed, directory flush sequencer 1144 selects a next way of the current congruence class to process at block 1414. Directory flush sequencer 1144 determines at block 1420 whether directory flush processing has been paused, for example, to allow accelerated service via demand queue 1146 for a snooped memory access request that hits in CAPP directory 512 in accordance with the processes of FIGS. 15-16. Directory flush sequencer 1144 makes the determination illustrated at block 1420, for example, by reference to whether demand queue 1146 is empty. In response to a determination at block 1420 that directory flush processing is paused (e.g., demand queue 1146 is not empty), directory flush sequencer 1144 waits at block 1422 and then again determines at block 1420 whether directory flush processing remains paused or has resumed, as indicated, for example, by demand queue 1146 becoming empty.

In response to a determination at block 1420 that directory flush processing is not (or is no longer) paused, the process proceeds to block 1424, which illustrates directory flush sequencer 1144 reading the directory entry 1106 residing in the currently selected way of CAPP directory 512 and determining whether or not the coherence state specified by coherence state field 1112 of the directory entry 1106 indicates that CAPP 110 is responsible for writing back dirty data in the associated cache line in data array 552 to system memory 204. For example, in the exemplary coherence protocol of Table II, the M and T states indicate responsibility of CAPP 110 for writing back dirty data in the associated cache line to system memory 204. Of course, in other coherence protocols, additional or alternative coherence states can be utilized to designate write back responsibility. In response to a negative determination at block 1424, the process proceeds to block 1428, which is described below. If, however, directory flush sequencer 1144 determines at block 1424 that CAPP 110 is responsible for writing back the associated cache line in data array 552 to system memory 204, directory flush sequencer 1144 initiates on system fabric 206 of primary coherent system 102 a write memory access request targeting the real memory address indicated by the address tag in address tag field 1108 of the selected directory entry 1106. The write memory access request is transmitted with a data payload having a "poisoned" data value signifying a special uncorrectable error (SUE) (block 1426). In addition, at block 1428, directory flush sequencer 1144 updates coherence state field 1112 of the selected directory entry 1106 to an invalid state to signify that the associated cache line in data array 552 is no longer valid. Thereafter, the process shown in FIG. 14 returns to block 1412, which has been described.

As will be appreciated, FIG. 14 depicts a process of sequential directory flush processing in which all of the ways of a particular congruence class (identified by a particular index) are processed prior to proceeding to the next congruence class. In an alternative implementation, all of the indices for a particular way are processed prior to proceeding to the next way. In either implementation, all entries of CAPP directory 512 are processed.

Figure 15:
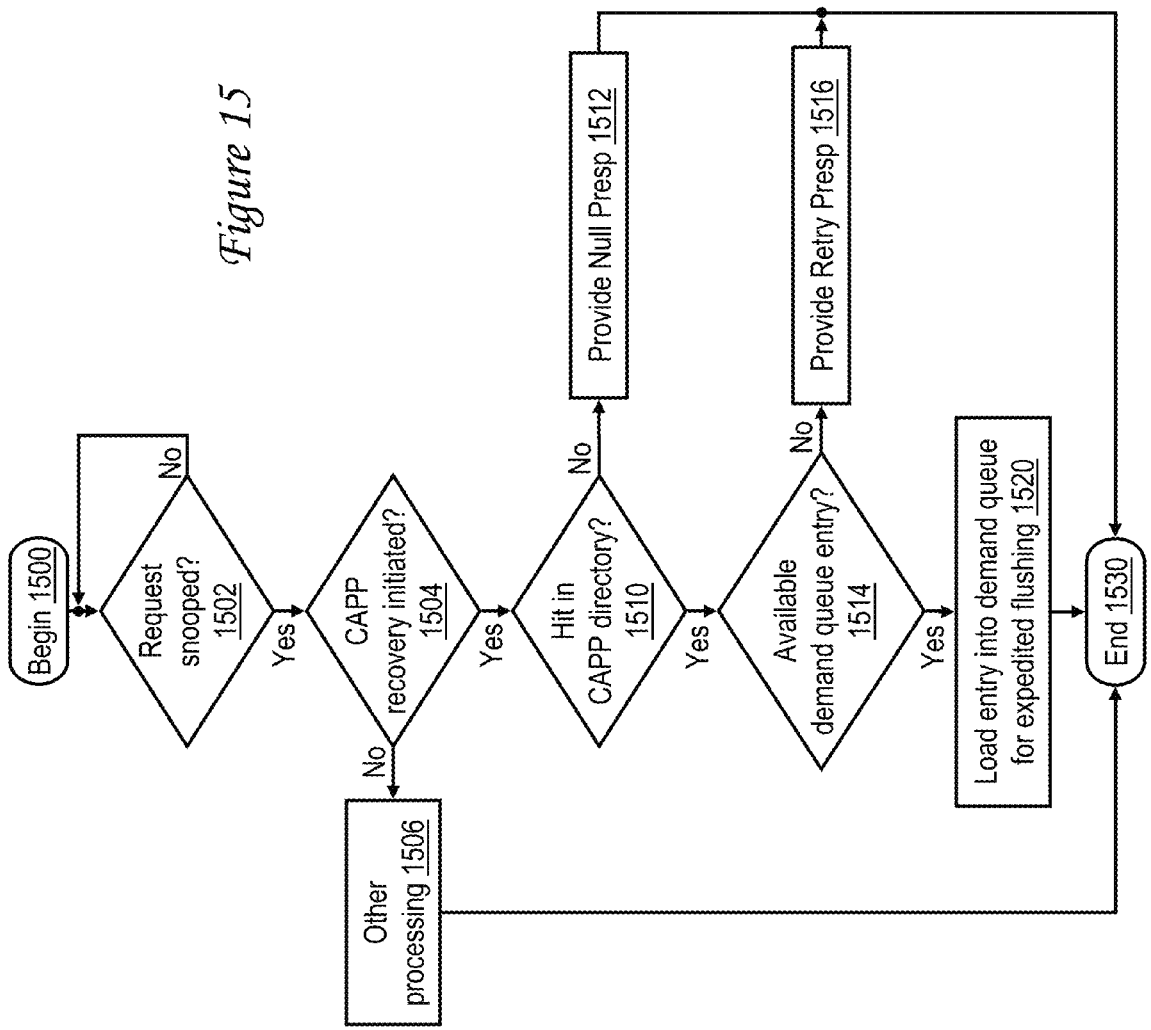
FIGS. 15-16 are high level logical flowcharts of exemplary processes by which flushing of selected CAPP directory entries is accelerated by reference to a demand queue in accordance with one embodiment.

With reference now to FIG. 15, there is illustrated a high level logical flowchart of an exemplary process by which selected CAPP directory entries are loaded into demand queue 1146 to accelerate the flushing of the CAPP directory entries in accordance with one embodiment. The depicted process begins at block 1500 and then proceeds to block 1502, which illustrates snooper logic 500 awaiting receipt of a snooped memory access request on system fabric 206. In response to receipt of a snooped memory access request, snooper logic 500 determines at block 1504 whether or not CAPP recovery processing has been initiated, for example, by examining the relevant bits of CAPP control register 1136. In response to a determination at block 1504 that CAPP recovery processing has not been initiated, snooper logic 500 services the snooped memory access request utilizing other snoop processing as previously described herein (block 1506). The process of FIG. 15 then ends at block 1530.

However, in response to a determination at block 1504 that CAPP recovery processing has been initiated, snooper logic 500 reads CAPP directory 512 and determines at block 1510 whether or not the snooped memory access request hits in CAPP directory 512. If not, snooper logic 500 provides a Null Presp to the snooped memory access request (block 1512), and the process ends at block 1540. If, however, snooper logic 500 determines at block 1510 that the snooped memory access request hits in CAPP directory 512, snooper logic 500 determines at block 1514 whether or not an entry in demand queue 1146 is available for allocation. If not, snooper logic 500 provides a Retry Presp to the snooped memory access request (block 1516), which forces the source of the snooped memory access request to reissue the snooped memory access request. The process thereafter ends at block 1530. If, however, snooper logic 500 determines at block 1514 that a queue entry in demand queue 1146 is available for allocation, snooper logic 500 loads the matching directory entry 1106 into the entry of demand queue 1146 for accelerated flushing out of the sequential order employed by the process of FIG. 14 (block 1520). Thereafter, the process ends at block 1530.

Figure 16:
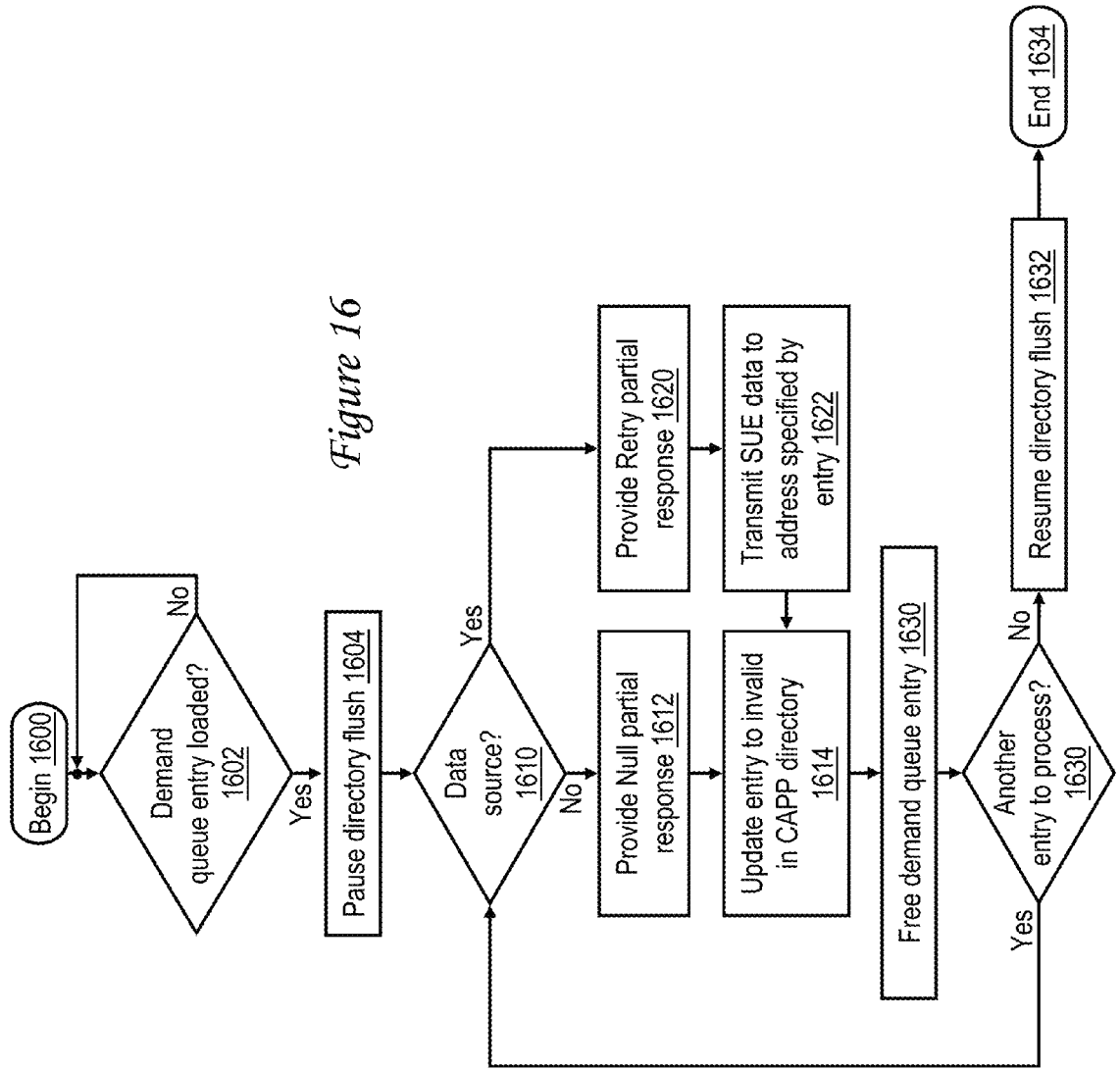

Referring now to FIG. 16, there is depicted a high level logical flowchart of an exemplary process by which directory flush sequencer 1144 provides accelerated flushing of selected entries of CAPP directory 512 in accordance with one embodiment. The depicted process begins at block 1600 and then proceeds to block 1602, which illustrates directory flush sequencer 1144 awaiting the loading of an entry of CAPP directory 512 into an entry of demand queue 1146. In response to an entry of CAPP directory 512 being loaded into an entry of demand queue 1146, directory flush sequencer 1144 pauses the sequential flushing of CAPP directory 512 in accordance with the process of FIG. 14, as previously described with reference to block 1420 (block 1604). At block 1610, directory flush sequencer 1144 determines whether or not the coherence state indicated by coherence state field 1112 of the directory entry 1106 loaded into demand queue 1146 designates AP 104 as a potential data source for the associated cache line via cache-to-cache intervention. For example, in the exemplary coherence protocol summarized in Table II, the M and T states designate a caching participant as a potential data source. Of course, in other coherence protocols, additional or alternative coherence states can be utilized to designate potential data sources.

In response to a negative determination at block 1610, snooper logic 500 provides a Null partial response to the snooped memory access request (block 1612) and updates the coherence state field 1112 of the directory entry 1106 in CAPP directory 512 to Invalid (block 1614). The process then passes to block 1630, which is described below. In response to a determination at block 1610 that the coherence state indicated by coherence state field 1112 of the directory entry 1106 loaded into demand queue 1146 designates AP 104 as a potential data source for the associated cache line, snooper logic 500 provides a Retry partial response to the snooped memory access request (block 1620). In addition, demand queue 1146 initiates on system fabric 206 a write memory access request targeting the real memory address indicated by the address tag in address tag field 1108 of the matching directory entry 1106. The write memory access request updates the memory location associated with the real memory address with a "poisoned" data value signifying a special uncorrectable error (SUE) (block 1622). In addition, snooper logic 500 updates the state field 1112 of the directory entry 1106 in CAPP directory 512 to Invalid (block 1614). The process then passes to block 1630.

Block 1630 illustrates directory flush sequencer 1144 deallocating or freeing the entry in demand queue 1146 containing the CAPP directory entry processed in accordance with blocks 1610-1622. Directory flush sequencer 1144 further determines at block 1630 whether another entry in demand queue 1146 remains to be processed. If so, the process returns to block 1610 and following blocks, which have been described. If, however, no additional entries in demand queue 1146 remain to be processed, directory flush sequencer 1144 resumes the sequential directory flush processing of FIG. 14 (block 1632). Thereafter, the process shown in FIG. 16 ends at block 1634.

Figure 17:
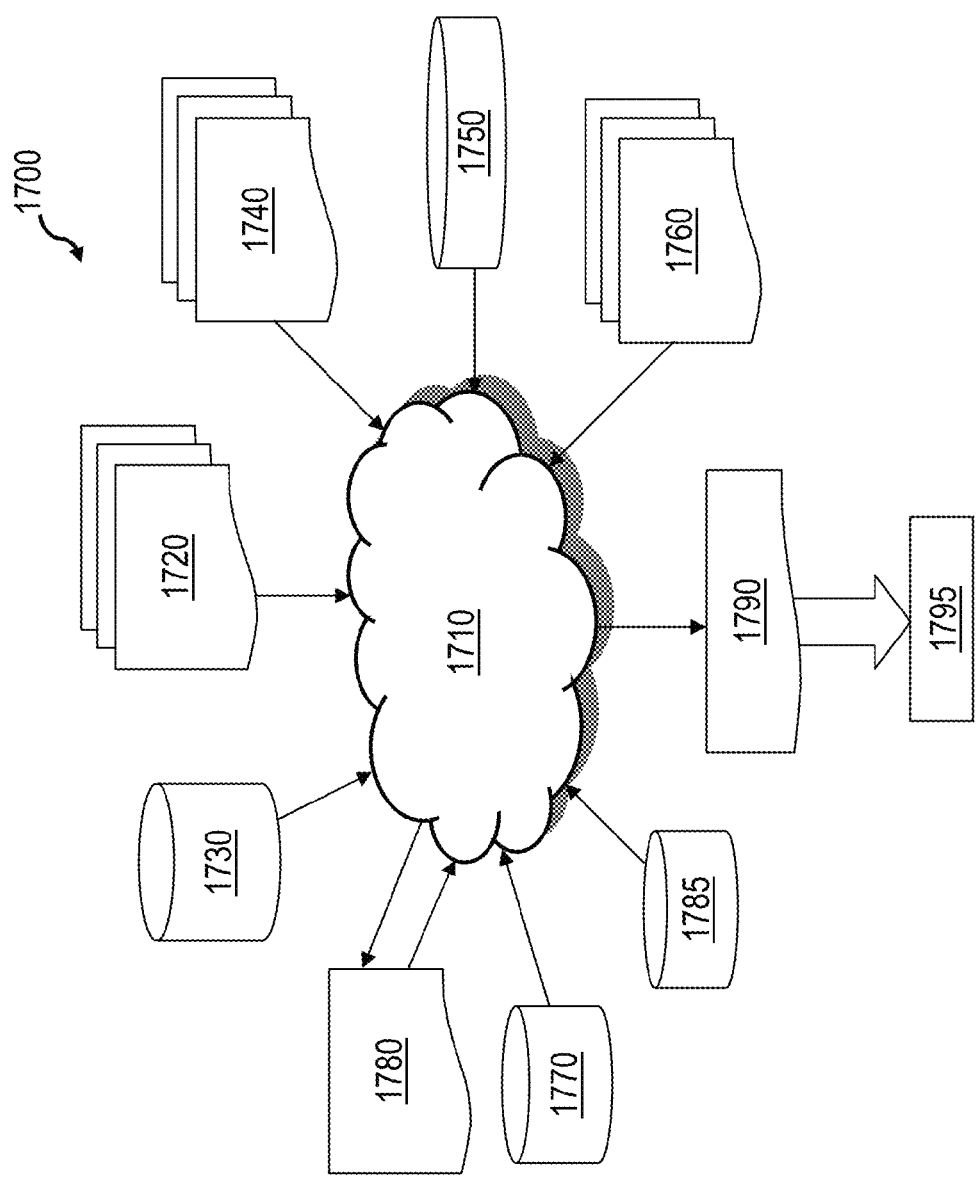
FIG. 17 is a data flow diagram of an exemplary design process.

With reference now to FIG. 17, there is depicted a block diagram of an exemplary design flow 1700 used for example, in semiconductor IC logic design, simulation, test, layout, and manufacture. Design flow 1700 includes processes, machines and/or mechanisms for processing design structures or devices to generate logically or otherwise functionally equivalent representations of the design structures and/or devices described above and shown in FIGS. 1-3, 5 and 11. The design structures processed and/or generated by design flow 1700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1700 may vary depending on the type of representation being designed. For example, a design flow 1700 for building an application specific IC (ASIC) may differ from a design flow 1700 for designing a standard component or from a design flow 1700 for instantiating the design into a programmable array, for example a programmable gate array (PGA) or a field programmable gate array (FPGA) offered by Altera® Inc. or Xilinx® Inc.

FIG. 17 illustrates multiple such design structures including an input design structure 1720 that is preferably processed by a design process 1710. Design structure 1720 may be a logical simulation design structure generated and processed by design process 1710 to produce a logically equivalent functional representation of a hardware device. Design structure 1720 may also or alternatively comprise data and/or program instructions that when processed by design process 1710, generate a functional representation of the physical structure of a hardware device. Whether representing functional and/or structural design features, design structure 1720 may be generated using electronic computer-aided design (ECAD) such as implemented by a core developer/designer. When encoded on a machine-readable data transmission, gate array, or storage medium, design structure 1720 may be accessed and processed by one or more hardware and/or software modules within design process 1710 to simulate or otherwise functionally represent an electronic component, circuit, electronic or logic module, apparatus, device, or system such as those shown in FIGS. 1-3, 5 and 11. As such, design structure 1720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1710 preferably employs and incorporates hardware and/or software modules for synthesizing, translating, or otherwise processing a design/simulation functional equivalent of the components, circuits, devices, or logic structures shown in FIGS. 1-3, 5 and 11 to generate a netlist 1780 which may contain design structures such as design structure 1720. Netlist 1780 may comprise, for example, compiled or otherwise processed data structures representing a list of wires, discrete components, logic gates, control circuits, I/O devices, models, etc. that describes the connections to other elements and circuits in an integrated circuit design. Netlist 1780 may be synthesized using an iterative process in which netlist 1780 is resynthesized one or more times depending on design specifications and parameters for the device. As with other design structure types described herein, netlist 1780 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1710 may include hardware and software modules for processing a variety of input data structure types including netlist 1780. Such data structure types may reside, for example, within library elements 1730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1740, characterization data 1750, verification data 1760, design rules 1770, and test data files 1785 which may include input test patterns, output test results, and other testing information. Design process 1710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1710 without deviating from the scope and spirit of the invention. Design process 1710 may also include modules for performing standard circuit design processes such as timing analysis, verification, design rule checking, place and route operations, etc.

Design process 1710 employs and incorporates logic and physical design tools such as HDL compilers and simulation model build tools to process design structure 1720 together with some or all of the depicted supporting data structures along with any additional mechanical design or data (if applicable), to generate a second design structure 1790. Design structure 1790 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1720, design structure 1790 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-3, 5 and 11. In one embodiment, design structure 1790 may comprise a compiled, executable HDL simulation model that functionally simulates the devices shown in FIGS. 1-3, 5 and 11.

Design structure 1790 may also employ a data format used for the exchange of layout data of integrated circuits and/or symbolic data format (e.g., information stored in a GDSII (GDS2), GL1, OASIS, map files, or any other suitable format for storing such design data structures). Design structure 1790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-3, 5 and 11. Design structure 1790 may then proceed to a stage 1795 where, for example, design structure 1790: proceeds to tape-out, is released to manufacturing, is released to a mask house, is sent to another design house, is sent back to the customer, etc.

As has been described, in at least one embodiment, a coherent attached processor proxy (CAPP) that participates in coherence communication in a primary coherent system on behalf of an attached processor external to the primary coherent system tracks delivery of data to destinations in the primary coherent system via one or more entries in a data structure. Each of the one or more entries specifies with a destination tag a destination in the primary coherent system to which data is to be delivered from the attached processor. In response to initiation of recovery operations for the CAPP, the CAPP performs data recovery operations, including transmitting, to at least one destination indicated by the destination tag of one or more entries, an indication of a data error in data to be delivered to that destination from the attached processor.

In at least one embodiment, a coherent attached processor proxy (CAPP) participates in coherence communication in a primary coherent system on behalf of an attached processor external to the primary coherent system. The CAPP includes an epoch timer that advances at regular intervals to define epochs of operation of the CAPP. Each of one or more entries in a data structure in the CAPP are associated with a respective epoch. Recovery operations for the CAPP are initiated based on a comparison of an epoch indicated by the epoch timer and the epoch associated with one of the one or more entries in the data structure.

In at least one embodiment, a coherent attached processor proxy (CAPP) that participates in coherence communication in a primary coherent system on behalf of an external attached processor maintains, in each of a plurality of entries of a CAPP directory, information regarding a respective associated cache line of data from the primary coherent system cached by the attached processor. In response to initiation of recovery operations, the CAPP transmits, in a generally sequential order with respect to the CAPP directory, multiple memory access requests indicating an error for addresses indicated by the plurality of entries. In response to a snooped memory access request that targets a particular address hitting in the CAPP directory during the transmitting, the CAPP performs a coherence recovery operation for the particular address prior to a time indicated by the generally sequential order.

While various embodiments have been particularly shown as described with reference to a preferred embodiment, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a computer-readable storage device (e.g., volatile or non-volatile memory, optical or magnetic disk or other statutory manufacture) that stores program code that can be processed by a data processing system. Further, the term "coupled" as used herein is defined to encompass embodiments employing a direct electrical connection between coupled elements or blocks, as well as embodiments employing an indirect electrical connection between coupled elements or blocks achieved using one or more intervening elements or blocks. In addition, the term "exemplary" is defined herein as meaning one example of a feature, not necessarily the best or preferred example.

What is claimed is:

1. A method of data processing, comprising:
   in a coherent attached processor proxy (CAPP) that participates in coherence communication in a primary coherent system on behalf of an attached processor external to the primary coherent system, tracking delivery of data to destinations in the primary coherent system via one or more entries in a data structure;
   in each of the one or more entries, specifying with a destination tag a destination in the primary coherent system to which data is to be delivered from the attached processor; and
   in response to initiation of recovery operations for the CAPP, performing data recovery operations for the CAPP, wherein performing data recovery operations includes the CAPP transmitting, to at least one destination indicated by the destination tag of one or more entries, an indication of a data error in data to be delivered to that destination from the attached processor.

2. The method of claim 1, and further comprising:
   at regular intervals, advancing an epoch timer having a plurality of values each defining an epoch of operation of the CAPP;
   associating each of the one or more entries in the data structure with a respective epoch; and
   initiating recovery operations for the CAPP based on a comparison between an epoch indicated by the epoch timer and the epoch associated with one of the one or more entries in the data structure.

3. The method of claim 2, wherein associating an epoch with each of the one or more entries comprises:
   associating with each of the one or more entries the value of the epoch timer at allocation of that entry.

4. The method of claim 1, and further comprising initiating recovery operations for the CAPP in response to a control register being set to indicate a need for recovery operations.

5. The method of claim 1, wherein the indication comprises a data value signifying an uncorrectable error.

6. The method of claim 1, wherein the indication comprises a poisoned data value.

7. The method of claim 6, wherein:
   the method includes determining whether a particular entry among the one or more entries indicates that a particular destination to which data is to be delivered is sensitive to a poisoned data value;
   the transmitting includes transmitting the indication to the particular destination in response to determining that determining that the particular entry does not indicate that the particular destination is sensitive to erroneous data; and
   in response to determining that the particular destination is sensitive to erroneous data, sending a benign data value in lieu of the poisoned data value to the particular destination.

* * * * *